US012592791B2

(12) United States Patent

Mattsson et al.

(10) Patent No.: US 12,592,791 B2

(45) Date of Patent: Mar. 31, 2026

(54) COMMUNICATION IDENTIFIER PADDING IN A COMMUNICATION NETWORK

(71) Applicant: Telefonaktiebolaget LM Ericsson (publ), Stockholm (SE)

(72) Inventors: John Mattsson, Täby (SE); Prajwol Kumar Nakarmi, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 336 days.

(21) Appl. No.: 18/561,843

(22) PCT Filed: May 16, 2022

(86) PCT No.: PCT/EP2022/063113

§ 371 (c)(1),
(2) Date: Nov. 17, 2023

(87) PCT Pub. No.: WO2022/243209

PCT Pub. Date: Nov. 24, 2022

(65) Prior Publication Data

US 2024/0243836 A1 Jul. 18, 2024

Related U.S. Application Data

(60) Provisional application No. 63/190,724, filed on May 19, 2021.

(51) Int. Cl.
| | |
|---|---|
| *H04L 1/00* | (2006.01) |
| *H04W 12/02* | (2009.01) |
| *H04W 12/72* | (2021.01) |

(52) U.S. Cl.
CPC ........... *H04L 1/0008* (2013.01); *H04W 12/02* (2013.01); *H04W 12/72* (2021.01)

(58) Field of Classification Search
CPC ...... H04L 1/0008; H04W 12/02; H04W 12/72
See application file for complete search history.

(56) References Cited

U.S. PATENT DOCUMENTS

| | | | | |
|---|---|---|---|---|
| 10,721,723 | B2 * | 7/2020 | Sun ........................ | H04L 5/0053 |
| 2012/0201177 | A1 * | 8/2012 | Adachi ................. | H04W 28/06 |
| | | | | 370/310 |

(Continued)

FOREIGN PATENT DOCUMENTS

| | | | | | | |
|---|---|---|---|---|---|---|
| EP | 2510660 | B1 | * | 5/2019 | .......... | H04L 5/0094 |
| EP | 3573366 | B1 | * | 1/2023 | .......... | H04L 1/0083 |
| WO | WO-2021089396 | A1 | * | 5/2021 | .......... | H04W 12/72 |

OTHER PUBLICATIONS

3GPP, "3GPP TS 38.401 V16.3.0", 3rd Generation Partnership Project; Technical Specification Group Radio Access Network; NG-RAN; Architecture description (Release 16), Sep. 2020, 1-78.

(Continued)

*Primary Examiner* — Mounir Moutaouakil

(74) *Attorney, Agent, or Firm* — Murphy, Bilak & Homiller, PLLC

(57) ABSTRACT

Communication equipment (20) is configured for use in a communication network (10). The communication equipment (20) determines an extent (24) to which a communication identifier (16) for the communication network (10) is to be padded in order for the communication identifier (16) to have a length that is included in a set (30) of allowed lengths. For each of at least two allowed lengths in the set (30), the allowed length differs from the next shortest or longest allowed length in the set (30) by a common length difference, and the longest allowed length among said at least two allowed lengths differs from the next longest allowed length in the set (30) by more than the common length difference. The communication equipment (20) performs, or assists other communication equipment (20) to (Continued)

SET 30 OF ALLOWED LENGTHS

15 ↔ 16 ↔ 17 ↔ 18 ↔ 19 ↔ 20 ↔ 21 ↔ 22 ↔ 23 ↔ 24 ↔ 25 ↔ 38

1 1 1 1 1 1 1 1 1 1 13

CONFIGURATION PARAMETERS 30P

15

25 38

LOWER LENGTH THRESHOLD 30L

UPPER LENGTH THRESHOLD 30U

MAX ALLOWED LENGTH 30M perform, padding of the communication identifier (16) to the determined extent (24).

20 Claims, 22 Drawing Sheets

(56)                     References Cited

U.S. PATENT DOCUMENTS

| 2019/0116046 | A1* | 4/2019 | Hoyer | .................. | H04L 9/0643 |
| 2019/0349004 | A1* | 11/2019 | Zhang | .............. | H03M 13/6516 |
| 2022/0070149 | A1* | 3/2022 | Sellers, Jr. | .......... | H04L 63/0428 |
| 2022/0408243 | A1* | 12/2022 | Mattsson | ............. | H04W 12/40 |
| 2025/0193062 | A1* | 6/2025 | Jia | ....................... | H04L 27/2605 |

OTHER PUBLICATIONS

3GPP, "3rd Generation Partnership Project; Technical Specification Group Services and System Aspects; System architecture for the 5G System (5GS); Stage 2 (Release 17)", 3GPP TS 23.501 V17.0.0, Mar. 2021, 1-489.

3GPP, "3GPP TS 23.003 V17.1.0", 3rd Generation Partnership Project; Technical Specification Group Core Network and Terminals; Numbering, addressing and identification; (Release 17), Mar. 2021, 1-143.

3GPP, "3rd Generation Partnership Project; Technical Specification Group Services and System Aspects; Procedures for the 5G System (5GS); Stage 2 (Release 17)", 3GPP TS 23.502 V17.0.0, Mar. 2021, 1-646.

3GPP, "3rd Generation Partnership Project; Technical Specification Group Services and System Aspects; Security architecture and procedures for 5G system (Release 17)", 3GPP TS 33.501 V17.1.0, Mar. 2021, 1-256.

Dekok, A., "RFC 7542—The Network Access Identifier", Internet Engineering Task Force (IETF), Request for Comments: 7542, Obsoletes: 4282, May 2015, 1-30.

Ericsson, "Concealing the length of NAI format SUPI exposed in SUCI by padding the SUPI before using non-null schemes", 3GPP TSG-SA3 Meeting #105-e, S3-214302, e-meeting, Nov. 8-19, 2021, 1-6.

Mattsson, John Preuβ, et al., "Nori: Concealing the Concealed Identifier in 5G", arXiv:2105.10440, Jun. 2021, 1-9.

Mayrhofer, Alexander, "RFC 8467—Padding Policies for Extension Mechanisms for DNS (EDNS(0))", IETF Datatracker, Oct. 12, 2018, 1-12.

Gillmor, Daniel Kahn, "Empirical DNS Padding Policy", NDSS Dprive workshop 2017, San Diego, CA, 1-36.

\* cited by examiner

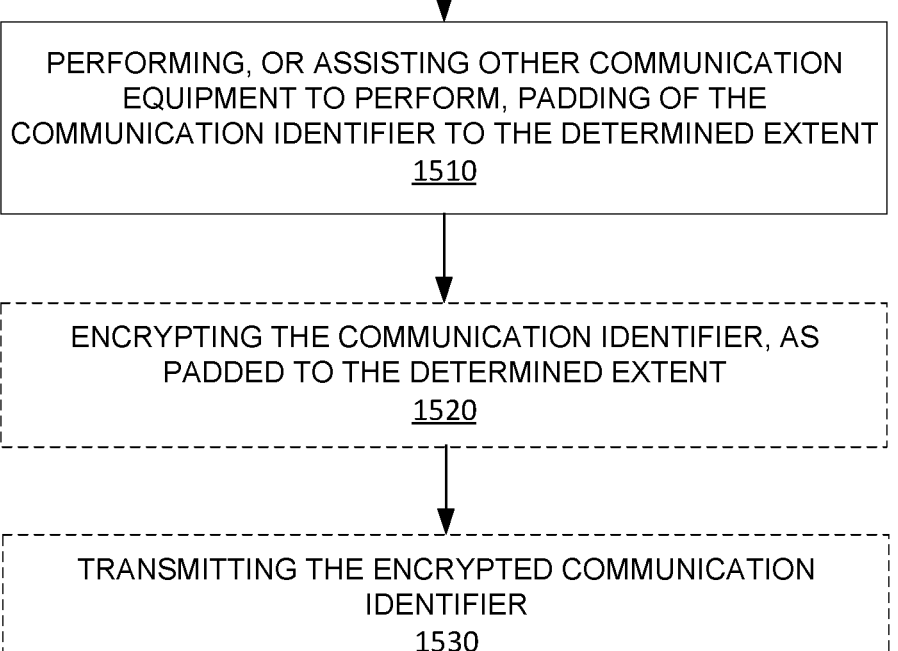

DETERMINING AN EXTENT TO WHICH A COMMUNICATION IDENTIFIER FOR THE COMMUNICATION NETWORK IS TO BE PADDED IN ORDER FOR THE COMMUNICATION IDENTIFIER TO HAVE A LENGTH THAT IS INCLUDED IN A SET OF ALLOWED LENGTHS, WHEREIN, FOR EACH OF AT LEAST TWO ALLOWED LENGTHS IN THE SET, THE ALLOWED LENGTH DIFFERS FROM THE NEXT SHORTEST OR LONGEST ALLOWED LENGTH IN THE SET BY A COMMON LENGTH DIFFERENCE, AND WHEREIN THE LONGEST ALLOWED LENGTH AMONG SAID AT LEAST TWO ALLOWED LENGTHS DIFFERS FROM THE NEXT LONGEST ALLOWED LENGTH IN THE SET BY MORE THAN THE COMMON LENGTH DIFFERENCE
1500

PERFORMING, OR ASSISTING OTHER COMMUNICATION EQUIPMENT TO PERFORM, PADDING OF THE COMMUNICATION IDENTIFIER TO THE DETERMINED EXTENT
1510

ENCRYPTING THE COMMUNICATION IDENTIFIER, AS PADDED TO THE DETERMINED EXTENT
1520

TRANSMITTING THE ENCRYPTED COMMUNICATION IDENTIFIER
1530

*FIGURE 15*

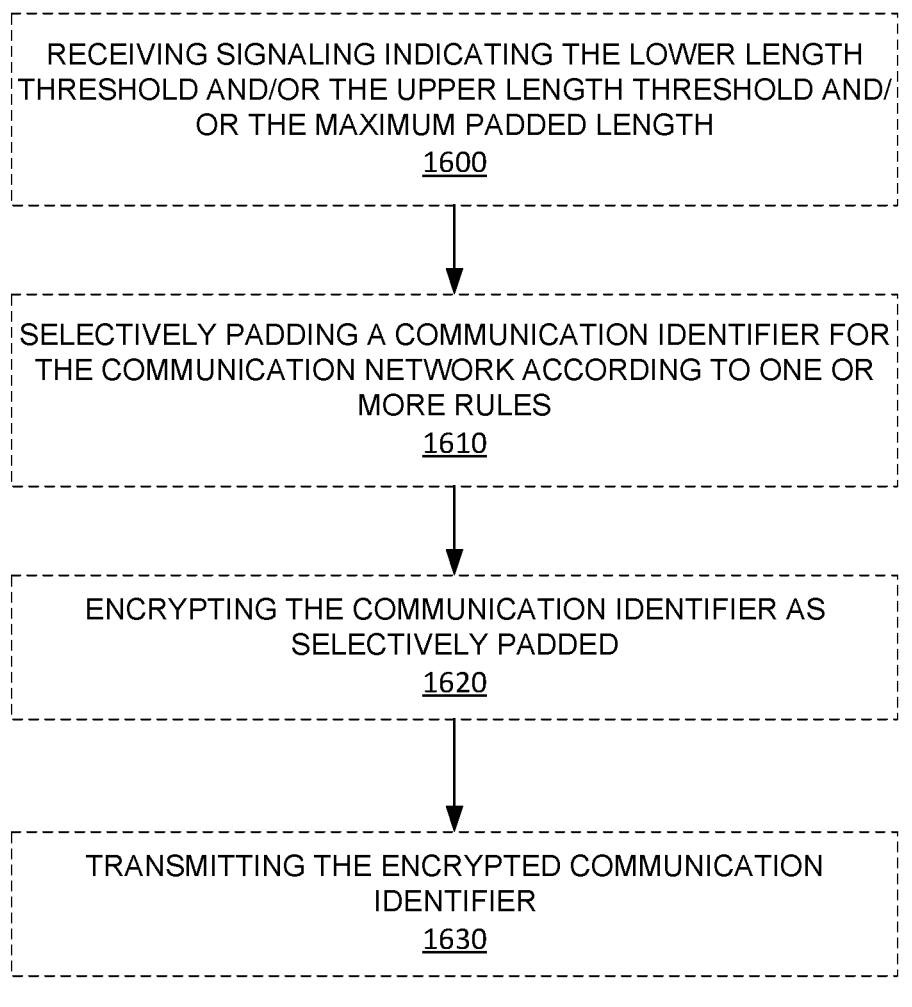

RECEIVING SIGNALING INDICATING THE LOWER LENGTH THRESHOLD AND/OR THE UPPER LENGTH THRESHOLD AND/OR THE MAXIMUM PADDED LENGTH
1600

SELECTIVELY PADDING A COMMUNICATION IDENTIFIER FOR THE COMMUNICATION NETWORK ACCORDING TO ONE OR MORE RULES
1610

ENCRYPTING THE COMMUNICATION IDENTIFIER AS SELECTIVELY PADDED
1620

TRANSMITTING THE ENCRYPTED COMMUNICATION IDENTIFIER
1630

*FIGURE 16*

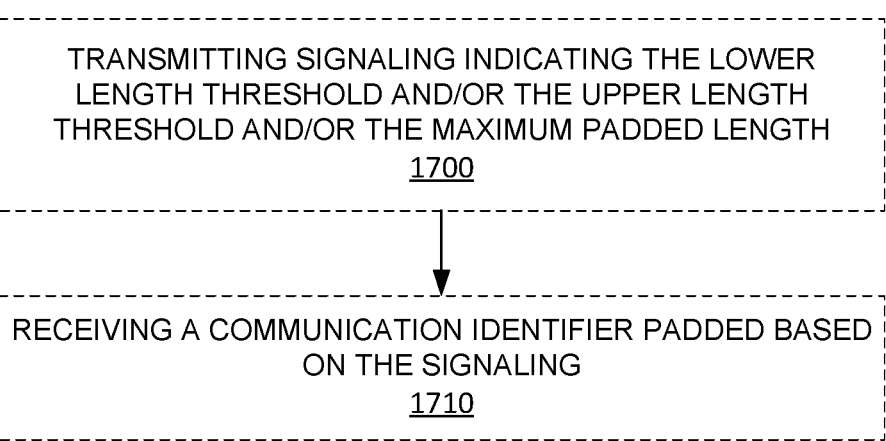

TRANSMITTING SIGNALING INDICATING THE LOWER LENGTH THRESHOLD AND/OR THE UPPER LENGTH THRESHOLD AND/OR THE MAXIMUM PADDED LENGTH
1700

RECEIVING A COMMUNICATION IDENTIFIER PADDED BASED ON THE SIGNALING
1710

*FIGURE 17A*

COMMUNICATION IDENTIFIER PADDING IN A COMMUNICATION NETWORK

TECHNICAL FIELD

The present application relates generally to a communication network, and relates more particularly to communication identifier padding in such a network.

BACKGROUND

Identifiers facilitate communication in a communication network, such as by identifying particular equipment in the communication network or by identifying a subscription based on which the communication network is to provide service. For example, in a wireless communication network, a Subscription Permanent Identifier (SUPI) is a long-term identifier of a subscription to the wireless communication network. In this case, a wireless device transmits its SUPI, or an encrypted version thereof, to the wireless communication network in order to identify the subscription based on which the wireless device requests service.

Security challenges exist though in mitigating the extent to which the use of identifiers reveals private information, such as the location or presence of a communication device transmitting an identifier. Encrypting an identifier before transmission certainly helps guard against this. But, if encrypted identifiers have different lengths, even the encrypted identifiers are not truly anonymous and can reveal private information to some extent. Accordingly, in some known approaches, communication identifiers of varying lengths are padded as needed so that all of the communication identifiers will have the same length after encryption. In other known approaches, referred to as block-length padding (blk-sz-min), communication identifiers are padded to a length that is a multiple of blocks of size sz, starting at min number of blocks. In still other known approaches, referred to as a power-length padding (pwr-b-min), communication identifiers are padded to a length that is a power of base b, starting at min power.

Although padding improves the security of communication identifiers, padding comes at the expense of additional bandwidth requirements for transmission.

SUMMARY

Some embodiments herein pad a communication identifier to the extent that doing so meaningfully improves the anonymity of the communication identifier. In one embodiment, for example, if padding the communication identifier would not meaningfully improve the anonymity of the communication identifier, the identifier is not padded to any extent. In this case, then, the embodiments avoid the increase in transmission bandwidth requirements that would have resulted from padding the identifier, when padding the identifier would not have meaningfully improved the anonymity of the identifier anyway. Generally, then, some embodiments pad different communication identifiers for a communication network to different extents, as needed to meaningfully improve identifier anonymity while also minimizing transmission bandwidth requirements.

More particularly, embodiments herein include a method performed by communication equipment configured for use in a communication network. The method comprises determining an extent to which a communication identifier for the communication network is to be padded in order for the communication identifier to have a length that is included in a set of allowed lengths. In some embodiments, for each of at least two allowed lengths in the set, the allowed length differs from the next shortest or longest allowed length in the set by a common length difference, and the longest allowed length among said at least two allowed lengths differs from the next longest allowed length in the set by more than the common length difference. The method also comprises performing, or assisting other communication equipment to perform, padding of the communication identifier to the determined extent.

In some embodiments, the common length difference is equal to 1 such that, for each of said at least two allowed lengths in the set, the allowed length differs from the next shortest or longest allowed length in the set by 1.

In some embodiments, the shortest allowed length among said at least two allowed lengths is the shortest allowed length in the set of allowed lengths.

In some embodiments, the shortest allowed length among said at least two allowed lengths is longer than the shortest allowed length in the set of allowed lengths.

In some embodiments, the shortest allowed length among said at least two allowed lengths differs from the next longest allowed length in the set by the common length difference.

In some embodiments, the longest allowed length among said at least two allowed lengths differs from the next shortest allowed length in the set by the common length difference.

In some embodiments, the next longest allowed length from which the longest allowed length among said at least two allowed lengths differs by more than the common length difference is the longest allowed length in the set.

In some embodiments, the set of allowed lengths comprises range of consecutive lengths between a lower length threshold and an upper length threshold. In some embodiments, each allowed length in the range of consecutive lengths differs from the next shortest or longest allowed length in the set by 1. In some embodiments, the set of allowed lengths also comprises a maximum allowed length. In some embodiments, the longest allowed length in the range differs from the maximum allowed length by more than 1. In one or more of these embodiments, said determining comprises, if the length of the communication identifier is less than the lower length threshold, determining an extent to which the communication identifier is to be padded in order for the communication identifier to have a length equal to the lower length threshold. Said determining also comprises, if the length of the communication identifier is greater than the upper length threshold, determining an extent to which the communication identifier is to be padded in order for the communication identifier to have a length equal to the maximum allowed length. Said determining also comprises, if the length of the communication identifier is greater than or equal to the lower length threshold and is less than or equal to the upper length threshold, determining that the communication identifier need not be padded to any extent in order for the communication identifier to have a length that is included in the set of allowed lengths. In one or more of these embodiments, the method further comprises receiving, from a network node, signaling indicating the lower length threshold and/or the upper length threshold and/or the maximum allowed length. In one or more of these embodiments, at least one of the lower length threshold, the upper length threshold, and the maximum allowed length is preconfigured at the communication equipment. In one or more of these embodiments, at least one of the lower length threshold, the upper length threshold, and the maximum allowed length is preconfigured on an integrated circuit card that is embedded in or removably inserted in the communication equipment.

In some embodiments, the method further comprises encrypting the communication identifier, as padded to the determined extent. In one or more of these embodiments, the encrypted communication identifier is a Subscription Concealed Identifier, SUCI.

In some embodiments, said assisting comprises transmitting, to the other communication equipment, signaling indicating the determined extent to which the communication identifier is to be padded.

In some embodiments, the communication equipment is core network equipment, and the other communication equipment is a wireless device.

In some embodiments, the communication equipment is core network equipment.

In some embodiments, the communication equipment is a wireless device. In some embodiments, said performing or assisting comprises performing padding of the communication identifier to the determined extent. In one or more of these embodiments, the method further comprises receiving, from core network equipment, signaling indicating the set of allowed lengths. In one or more of these embodiments, the signaling indicates the set of allowed lengths by indicating a lower length threshold representing the shortest allowed length among said at least two allowed lengths in the set. The signaling indicates the set of allowed lengths by also indicating an upper length threshold representing the longest allowed length among said at least two allowed lengths in the set. The signaling indicates the set of allowed lengths by also indicating the longest allowed length in the set. In one or more of these embodiments, the method further comprises transmitting, to a network node, signaling indicating a scheme according to which the wireless device has padded the communication identifier.

Other embodiments herein include a method performed by communication equipment configured for use in a communication network. The method comprises determining whether or not to pad a communication identifier for the communication network based respectively on whether or not an unpadded length of the communication identifier is included in a range of allowed unpadded lengths. In some embodiments, the longest allowed unpadded length in the range is shorter than a maximum padded length by a length greater than 1. The method also comprises padding or not padding the communication identifier according to said determining.

In some embodiments, the shortest allowed unpadded length in the range is a minimum padded length to which communication identifiers shorter than the shortest allowed unpadded length are padded.

In some embodiments, said determining comprises, if the unpadded length of the communication identifier is shorter than the shortest allowed unpadded length in the range, determining to pad the communication identifier in order for the communication identifier to have the shortest allowed unpadded length in the range.

In some embodiments, said determining comprises, if the unpadded length of the communication identifier is longer than the longest allowed unpadded length in the range, determining to pad the communication identifier in order for the communication identifier to have the maximum padded length.

In some embodiments, said determining comprises, if the unpadded length of the communication identifier is included in the range of allowed unpadded lengths, determining to not pad the communication identifier.

In some embodiments, said determining comprises comparing the unpadded length of the communication identifier to a minimum unpadded length threshold representing the shortest allowed unpadded length in the range. Said determining also comprises determining to pad the communication identifier to the minimum unpadded length if, according to said comparing, the unpadded length of the communication identifier is shorter than the minimum unpadded length threshold.

In some embodiments, said determining comprises comparing the unpadded length of the communication identifier to a maximum unpadded length threshold representing the longest allowed unpadded length in the range. Said determining also comprises determining to pad the communication identifier to the maximum padded length if, according to said comparing, the unpadded length of the communication identifier is longer than the maximum unpadded length threshold.

In some embodiments, said determining comprises comparing the unpadded length of the communication identifier to a minimum unpadded length threshold representing the shortest allowed unpadded length in the range and to a maximum unpadded length threshold representing the longest allowed unpadded length in the range. Said determining also comprises determining to not pad the communication identifier if, according to said comparing, the unpadded length of the communication identifier is longer than or equal to the minimum unpadded length threshold and is shorter than or equal to the maximum unpadded length threshold.

In some embodiments, the method further comprises receiving, from a network node, signaling indicating the minimum unpadded length threshold.

In some embodiments, the method further comprises receiving, from a network node, signaling indicating the maximum unpadded length threshold In some embodiments, the method further comprises receiving, from a network node, signaling indicating the range of allowed unpadded lengths and/or the maximum padded length.

In some embodiments, communication identifiers longer than the longest allowed unpadded length are to be padded to the maximum padded length.

In some embodiments, the communication equipment is core network equipment.

In some embodiments, the communication equipment is a wireless device. In one or more of these embodiments, the method further comprises receiving, from network equipment, signaling indicating the range of allowed unpadded lengths. In one or more of these embodiments, the signaling indicates the range of allowed unpadded lengths by indicating the shortest allowed unpadded length in the range. The signaling indicates the range of allowed unpadded lengths by indicating the longest allowed unpadded length in the range.

In some embodiments, the method further comprises encrypting the communication identifier, as padded or not padded according to said determining. In one or more of these embodiments, the encrypted communication identifier is a Subscription Concealed Identifier, SUCI.

Other embodiments herein include a method performed by communication equipment configured for use in a communication network. The method comprises comparing a length of a communication identifier for the communication network to a lower length threshold and to an upper length threshold. In some embodiments, the upper length threshold is greater than the lower length threshold. The method also comprises, if the length of the communication identifier is less than the lower length threshold according to said comparing, padding the communication identifier in order for the communication identifier to have a length equal to the lower length threshold. The method also comprises, if the length of the communication identifier is greater than the upper length threshold according to said comparing, padding the communication identifier in order for the communication identifier to have a length equal to a maximum padded length. In some embodiments, the maximum padded length is greater than the upper length threshold. The method also comprises, if the length of the communication identifier is greater than or equal to the lower length threshold and is less than or equal to the upper length threshold according to said comparing, refraining from padding the communication identifier.

In some embodiments, the method further comprises encrypting the communication identifier after said padding or said refraining from padding.

Other embodiments herein include a method performed by communication equipment configured for use in a communication network. The method comprises selectively padding a communication identifier for the communication network according to one or more rules. In some embodiments, according to the one or more rules, if the length of the communication identifier is less than a lower length threshold, the communication identifier is to be padded to the lower length threshold. In some embodiments, according to the one or more rules, if the length of the communication identifier is greater than an upper length threshold, the communication identifier is to be padded to a maximum padded length. In some embodiments, the maximum padded length is greater than the upper length threshold. In some embodiments, according to the one or more rules, if the length of the communication identifier is greater than or equal to the lower length threshold and is less than or equal to the upper length threshold, the communication identifier is not to be padded.

In some embodiments, the method further comprises encrypting the communication identifier as selectively padded.

In some embodiments, the method further comprises receiving, from a network node, signaling indicating the lower length threshold and/or the upper length threshold and/or the maximum padded length.

Other embodiments herein include a method performed by communication equipment configured for use in a communication network. The method comprises determining to which padded length to pad a communication identifier for the communication network, based on how many other communication identifiers for the communication network have, or are expected to have, an unpadded length that is the same as, or that is within the same range as, an unpadded length of the identifier. The method also comprises performing, or assisting other communication equipment to perform, padding of the communication identifier to the padded length.

Other embodiments herein include a method performed by communication equipment configured for use in a communication network. The method comprises obtaining a communication identifier for the communication network. The method also comprises deciding, based on whether a length of the communication identifier is between a lower length threshold and an upper length threshold, whether to pad the communication identifier. In some embodiments, the upper length threshold is less than a maximum padded identifier length. The method also comprises padding, or not padding, the communication identifier according to said deciding.

In some embodiments, the upper length threshold is less than a maximum padded identifier length by a length more than 2.

Other embodiments herein include a method performed by communication equipment configured for use in a communication network. The method comprises receiving, from a network node, signaling indicating a lower length threshold and an upper length threshold. In some embodiments, a communication identifier with a length below the lower length threshold is to be padded to the lower length threshold, wherein a communication identifier with a length above the upper length threshold is to be padded to a maximum padded length. In some embodiments, a communication identifier with a length between the lower length threshold and the upper length threshold is not to be padded.

In some embodiments, the method further comprises selectively padding a communication identifier based on the lower length threshold and the upper length threshold indicated by the received signaling.

Other embodiments herein include a method performed by communication equipment configured for use in a communication network. The method comprises determining if and how much to pad a communication identifier for the communication network, depending on a length of the communication identifier and one or more configured values.

In some embodiments, the one or more configured values include at least one configured value provisioned by the communication network.

In some embodiments, the one or more configured valued include at least one configured value that is preconfigured according to a communication network standard.

In some embodiments, the one or more configured values include a value of a lower length threshold to which to pad the communication identifier if the length of the communication identifier is less than the lower length threshold. The one or more configured values also include a value of an upper length threshold. In some embodiments, the communication identifier is not to be padded if the length of the communication identifier is greater than or equal to the lower length threshold and is less than or equal to the upper length threshold. The one or more configured values also include a maximum padded length to which to pad the communication identifier if the length of the communication identifier is greater than the upper length threshold.

In some embodiments, the method further comprises providing user data and forwarding the user data to a host via the transmission to the network node.

Other embodiments herein include a method performed by a network node configured for use in a communication network. The method comprises transmitting, from the network node to a communication device in the communication network, signaling indicating a lower length threshold and an upper length threshold. In some embodiments, a communication identifier with a length below the lower length threshold is to be padded to the lower length threshold. In some embodiments, a communication identifier with a length above the upper length threshold is to be padded to a maximum padded length. In some embodiments, a communication identifier with a length between the lower length threshold and the upper length threshold is not to be padded.

Still other embodiments herein include corresponding apparatus, including corresponding communication equipment and corresponding network node configured to perform the respective methods described above. Embodiments herein also include corresponding computer programs and carriers of those computer programs.

Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 15 is a logic flow diagram of a method performed by communication equipment according to some embodiments.

FIG. 16 is a logic flow diagram of a method performed by communication equipment according to other embodiments.

FIG. 17A is a logic flow diagram of a method performed by a network node according to some embodiments.

DETAILED DESCRIPTION

Figures 1, 2:
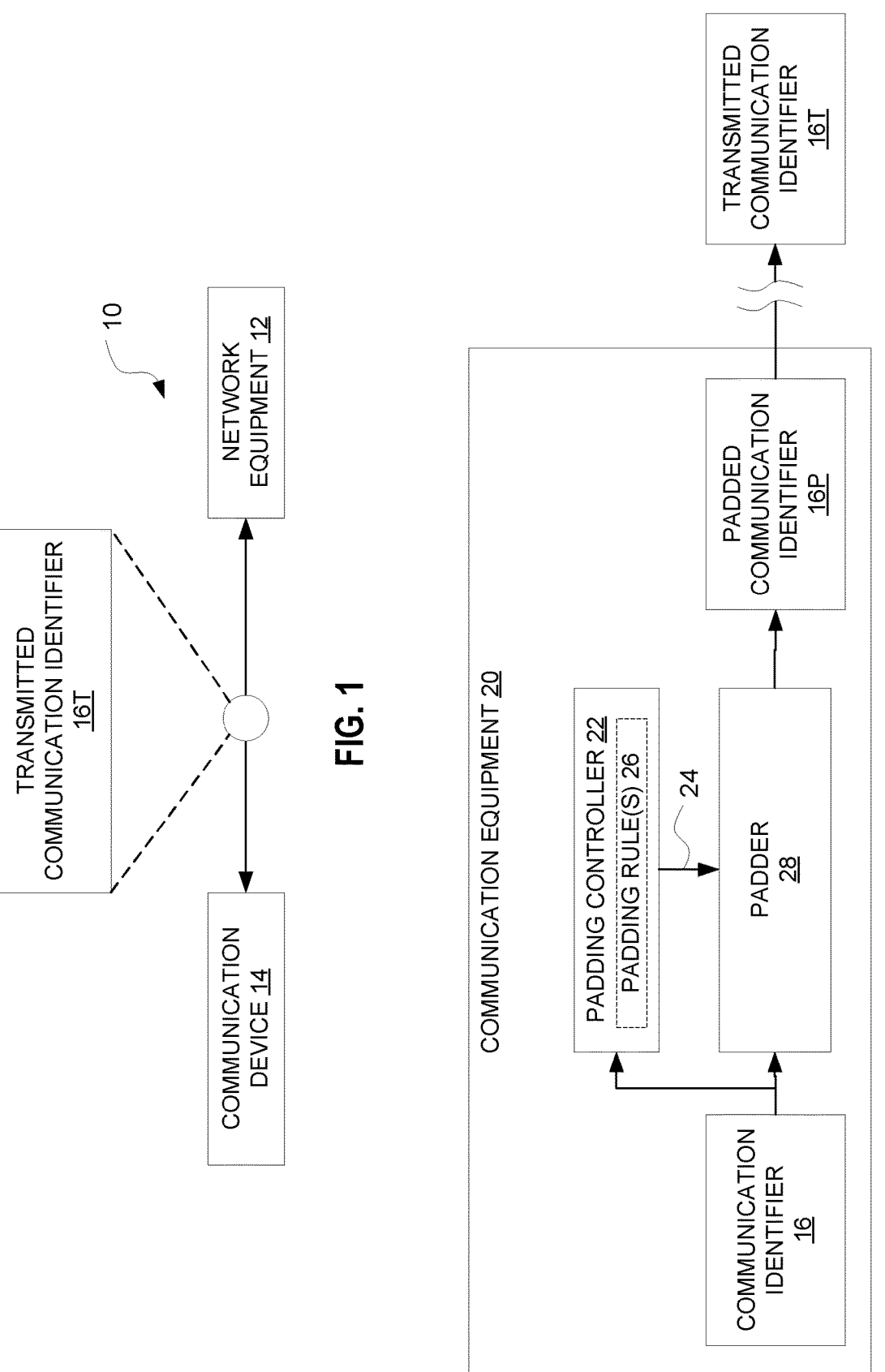
FIG. 1 is a block diagram of a communication device and network equipment in a communication network according to some embodiments.
FIG. 2 is a block diagram of communication equipment according to some embodiments.

FIG. 1 shows a communication network 10 according to some embodiments. The communication network 10 may be a wireless communication network (e.g., a 5G network) or a wired communication network.

Communication occurs between communication equipment in the communication network 10. As shown, for instance, communication occurs between communication equipment in the form of network equipment 12 and a communication device 14. Where the communication network 10 is a wireless communication network 10, the network equipment 12 may for example be core network equipment and the communication device 14 may be a wireless communication device such as a user equipment (UE).

To facilitate communication between communication equipment in the communication network 10, a communication identifier 16T is transmitted between the communication equipment. In some embodiments, for example, communication equipment in the form of the communication device 14 transmits the communication identifier 16T to network equipment 12, e.g., as part of a registration procedure in order to identify the communication device 14 or a subscription based on which the communication device 14 requests service.

In some embodiments, though, communication equipment forms the transmitted communication identifier 16T using padding shown in FIG. 2. FIG. 2 in this regard shows communication equipment 20, e.g., in the form of communication device 14 or network equipment 12. The communication equipment 20 obtains a communication identifier 16. The communication identifier 16 may for example be a SUbscription Permanent Identifier (SUPI) or a portion of a SUPI, e.g., such as a username portion of the SUPI. In any event, a padding controller 22 determines an extent 24 to which the communication identifier 16 is to be padded, e.g., according to one or more padding rules 26, and controls a padder 28 to pad the communication identifier 16 to the determined extent 24. The padding controller 22 may for instance determine that the extent 24 to which the communication identifier 16 is to be padded is none, i.e., padding to no extent means that the communication identifier 16 is not padded. Or, the padding controller 22 may determine that the communication identifier 16 is to be padded to some extent. Either way, the padder 28, as controlled by the padding controller 22, receives the communication identifier 16 as input, pads the communication identifier 16 to the extent 24 determined by the padding controller 22, and outputs the resulting padded communication identifier 16P. Note here that the padded communication identifier 16P may be the same as the input communication identifier 16 if the communication identifier 16 is padded to no extent. Regardless, the communication equipment 20 obtains the communication identifier 16T to transmit from this padded communication identifier 16P, rather than the (unpadded) communication identifier 16. For example, the communication equipment 20 may encrypt the padded communication identifier 16P to obtain the communication identifier 16T to transmit, e.g., a Subscription Concealed Identifier (SUCI).

More particularly with regard to padding, in some embodiments, the padding controller 22 determines the extent 24 to which the communication identifier 16 is to be padded in order for the communication identifier 16 to have a length that is included in a set of allowed lengths. In some embodiments, if the communication identifier 16 already has a length that is included in the set of allowed lengths, the padding controller 24 determines that the extent 24 to which the communication identifier 16 is to be padded is none, i.e., the communication identifier 16 in this case need not be padded in order to have a length that is included in the set of allowed lengths. By contrast, in some embodiments, if the communication identifier 16 does not already have a length that is included in the set of allowed lengths, the padding controller 24 determines that the communication identifier 16 is to be padded to some extent, e.g., the minimum extent needed for the communication identifier 16 to have the next longest length that is included in the set of allowed lengths.

Figure 3:
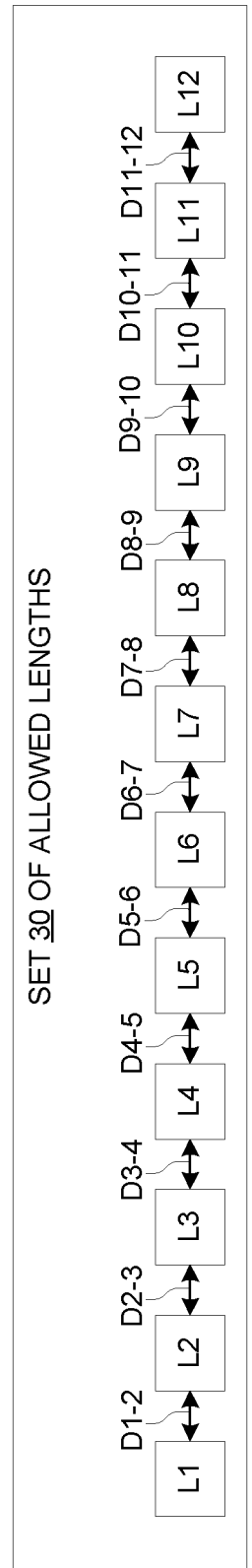
FIG. 3 is a block diagram of a set of allowed lengths according to some embodiments.

FIG. 3 illustrates a set 30 of allowed lengths according to one example. As shown, the set 30 includes allowed lengths L1-L12. Here, L1 is shorter than L2, L2 is shorter than L3, L3 is shorter than L4, and so on. Accordingly, L2 is the next longest length in the set 30 after L1, L3 is the next longest length in the set 30 after L2, L4 is the next longest length in the set 30 after L3, and so on. Correspondingly, with respect to length L12, length L11 is the next shortest length in the set 30; with respect to length L11, length L10 is the next shortest length is the set 30, and so on.

As shown, length L1 and length L2 differ by a difference D1-2. With respect to length L1, then, length L1 differs from the next longest allowed length L2 in the set 30 by the difference D1-2. And conversely, with respect to length L2, length L2 differs from the next shortest allowed length L1 in the set 30 by the difference D1-2.

As another example, length L11 and length L12 differ by a difference D11-12. With respect to length L11, then, length L11 differs from the next longest allowed length L12 in the set 30 by the difference D11-12. And conversely, with respect to length L12, length L12 differs from the next shortest allowed length L11 in the set 30 by the difference D11-12.

Figure 4A:
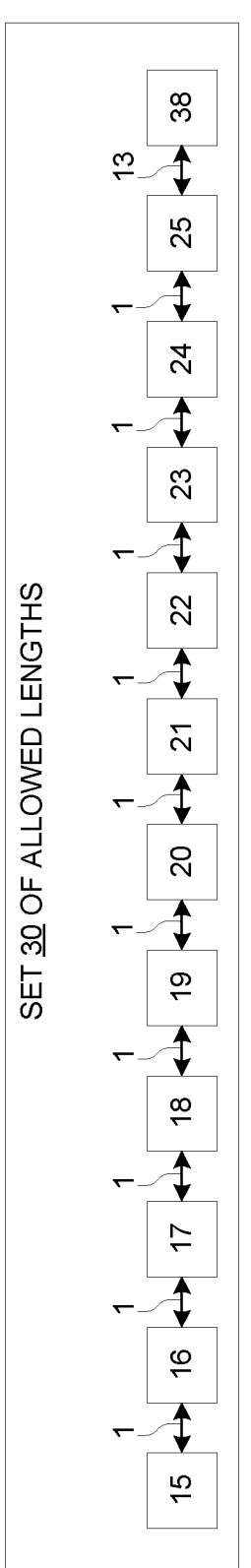
FIG. 4A is a block diagram of a set of allowed lengths according to other embodiments.

Notably, in at least some embodiments, for each of at least two allowed lengths in the set 30, the allowed length differs from the next shortest or longest allowed length in the set 30 by a common length difference D-C. With respect to the example in FIG. 3, for instance, this means that at least two of the length differences are the same, i.e., equal to D-C. That is, at least two of the length differences D1-2 through D11-D12 are equal to D-C. Moreover, in some embodiments, the longest allowed length among these at least two lengths differs from the next longest allowed length in the set 30 by more than the common length difference D-C. If, for example, length L11 is the longest allowed length in the set 30 among the at least two lengths, then length L11 differs from the next longest allowed length L12 in the set 30 by more than the common length difference D-C. FIG. 4A shows one example.

As shown in FIG. 4A, the set 30 of allowed lengths includes lengths {15, 16, 17, 18, 19, 20, 21, 22, 23, 24, 25, and 38}. In this case, for each of the allowed lengths 15 through 25, that allowed length differs from the next shortest or longest allowed length in the set 30 by a common length difference D-C=1. For example, allowed length 15 differs from the next longest allowed length 16 by 1, allowed length 16 differs from the next shortest allowed length 15 by 1 and also differs from the next longest allowed length 17 by 1, allowed length 17 differs from the next shortest allowed length 16 by 1 and also differs from the next longest allowed length 17 by 1, and so on until allowed length 25 differs from the next shortest allowed length 24 by 1. Notably, though, allowed length 25 is the longest allowed length among these allowed lengths 15 through 25. And allowed length 25 differs from the next longest allowed length 38 in the set 30 by more than 1, i.e., since allowed length 25 differs from the next longest allowed length 38 in the set by 13.

Note, then, according to the example set 30 of allowed lengths in FIG. 4A, if the communication identifier 16 has a length less than 15 (the shortest allowed length in the set 30), the communication identifier 16 will be padded to have a length of 15. If the communication identifier 16 has a length that is greater than or equal to 15 but is less than or equal to 25, the communication identifier 16 will not be padded at all. This is because lengths 15 through 25 are allowed lengths in the set 30. If the communication identifier 16 has a length that is greater than 25 but less than 38, the communication identifier 16 will be padded to have a length of 38. Finally, if the communication identifier 16 has a length of 38, the communication identifier 16 will not be padded.

In some embodiments, this set 30 of allowed lengths may be determined or based on how many communication identifiers for the communication network 10 have, or are expected to have, unpadded lengths that are the same. Some embodiments in this regard target to pad a communication identifier to a lesser extent (if at all) if there are at least a threshold number of other communication identifiers that have, or are expected to have, the same length. Indeed, the fact that there are at least a threshold number of other communication identifiers that have, or are expected to have, the same length suggests that the identifiers have sufficient anonymity in terms of their length already and/or would not experience meaningful improvement in anonymity with padding. By contrast, these embodiments target to pad a communication identifier to a greater extent if there are not at least the threshold number of other communication identifiers that have, or are expected to have, the same length. Indeed, the fact that there are not at least a threshold number of other communication identifiers that have, or are expected to have, the same length suggests that the identifiers do have sufficient anonymity in terms of their length already and/or would experience meaningful improvement in anonymity with padding. In this case, then, the improvement in anonymity provided by padding justifies the additional transmission bandwidth requirements resulting from padding.

Figures 4B, 5A:
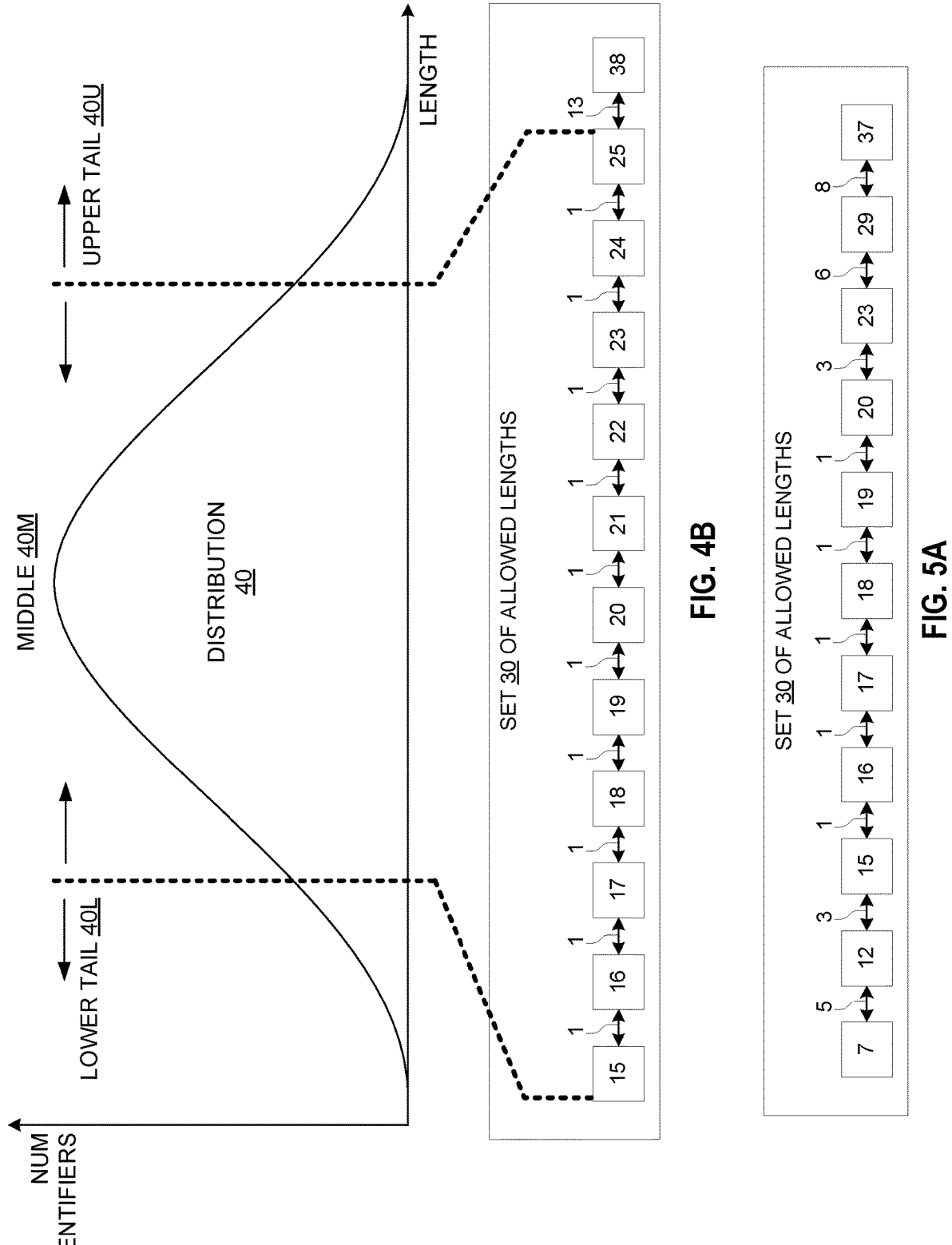
FIG. 4B is a block diagram of a set of allowed lengths according to yet other embodiments.
FIG. 5A is a block diagram of a set of allowed lengths according to still other embodiments.

FIG. 4B illustrates one example of how the set 30 of allowed lengths may be determined or based on a distribution 40 of communication identifier lengths in the communication network 10, e.g., where the distribution 40 may be the actual or expected distribution. As shown, the distribution 40 of communication identifier lengths in the communication network 10 is or resembles a normal distribution, with lengths at the tail ends 40L, 40U of the distribution 40 being less prevalent. In this case, then, identifiers with lengths at the tail ends 40L, 40U of the distribution 40 would benefit the most from padding in terms of meaningful improvement in anonymity, whereas identifiers in the middle 40M of the distribution 40 would benefit from padding the least. Accordingly, the set 30 of allowed lengths is configured such that identifiers with lengths in the lower tail 40L of the distribution 40 (i.e., lengths less than 15) are padded to have the shortest length in the middle 40M of the distribution 40; that is, padded to have a length of 15. And the set 30 of allowed lengths is configured such that identifiers with lengths in the middle 40M of the distribution (i.e., lengths 15 and s 25) are not padded to any extent. And the set 30 of allowed lengths is further configured such that identifiers with lengths in the upper tail 40U of the distribution 40 (i.e., lengths>25) are padded to have the maximum allowed length (i.e., 38). Accordingly, padding is selectively limited to identifiers having lengths in the tails 40L, 40U of the distribution 40.

As this example demonstrates, then, by having each at least two allowed lengths in the set 30 differ from the next shortest or longest allowed length in the set 30 by 1, the set 30 allows some identifiers (e.g., in the middle 40M of the distribution 40) to not be padded at all. And by having the longest one of those at least two allowed lengths (e.g., 25) differ from the next longest allowed length in the set 30 (e.g., 38) by more than 1, the set 30 allows some identifiers (e.g., in the upper tail 40U of the distribution 40) to be padded up to that next longest allowed length.

Figure 5B:
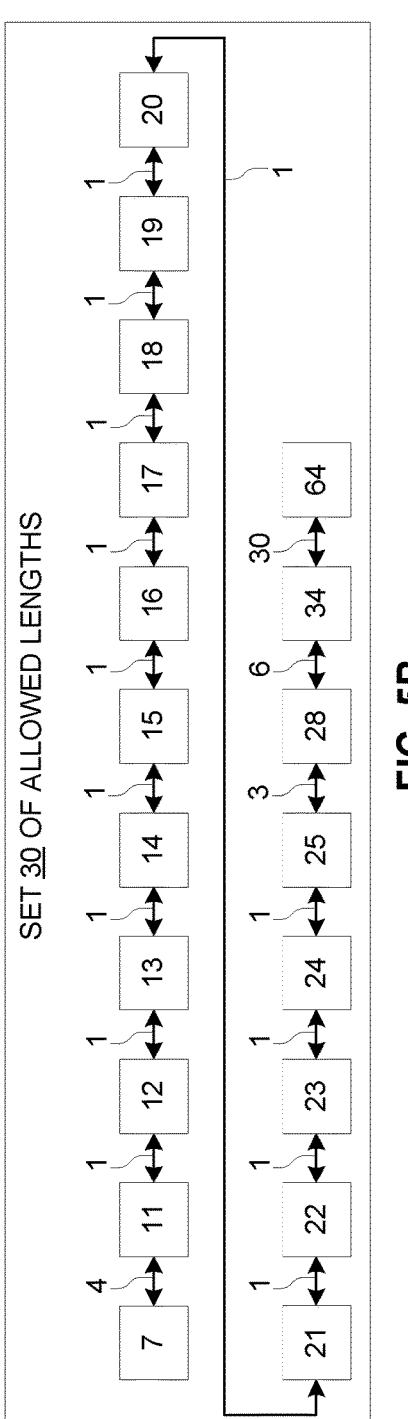
FIG. 5B is a block diagram of a set of allowed lengths according to further embodiments.

Of course, although FIG. 4B illustrated one example of the distribution 40, embodiments herein are not limited as such. FIGS. 5A-5B illustrate other example sets 30 of allowed lengths, e.g., that may be appropriate for different types of distributions 40.

As shown in FIG. 5A, the set 30 of allowed lengths includes {7, 12, 15, 16, 17, 18, 19, 20, 23, 29, and 37}. In this case, for each of the allowed lengths 15 through 20, that allowed length differs from the next shortest or longest allowed length in the set 30 by a common length difference $D-C=1$. For example, allowed length 15 differs from the next longest allowed length 16 by 1, allowed length 16 differs from the next shortest allowed length 15 by 1 and also differs from the next longest allowed length 17 by 1, allowed length 17 differs from the next shortest allowed length 16 by 1 and also differs from the next longest allowed length 17 by 1, and so on until allowed length 20 differs from the next shortest allowed length 19 by 1. Notably, though, allowed length 20 is the longest allowed length among these allowed lengths 15 through 20. And allowed length 20 differs from the next longest allowed length 23 in the set 30 by more than 1, i.e., since allowed length 20 differs from the next longest allowed length 23 in the set by 3.

Note that the set 30 of allowed lengths in FIG. 5A pads identifiers more and more as their lengths deviate more and more from the middle lengths 15-20. Moreover, the set 30 of allowed lengths in FIG. 5A is able to handle a skewed distribution.

As shown in FIG. 5B, the set 30 of allowed lengths includes {7, 11, 12, 13, 14, 15, 16, 17, 18, 19, 20, 21, 22, 23, 24, 25, 28, 34, and 64}. In this case, for each of the allowed lengths 11 through 25, that allowed length differs from the next shortest or longest allowed length in the set 30 by a common length difference $D-C=1$. Notably, though, allowed length 25 is the longest allowed length among these allowed lengths 11 through 25. And allowed length 25 differs from the next longest allowed length 28 in the set 30 by more than 1, i.e., since allowed length 25 differs from the next longest allowed length 28 in the set by 3.

Figure 5C:
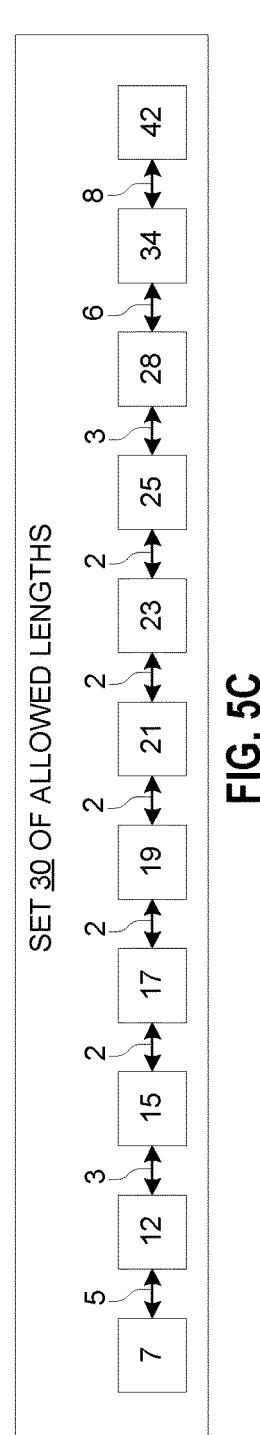
FIG. 5C is a block diagram of a set of allowed lengths according to other embodiments.

As shown in FIG. 5C, the set 30 of allowed lengths includes {7, 12, 15, 17, 19, 21, 23, 25, 28, 34, and 42}. In this case, for each of the allowed lengths 15, 17, 19, 21, 23, and 25, that allowed length differs from the next shortest or longest allowed length in the set 30 by a common length difference $D-C=2$. Notably, though, allowed length 25 is the longest allowed length among these allowed lengths. And allowed length 25 differs from the next longest allowed length 28 in the set 30 by more than 1, i.e., since allowed length 25 differs from the next longest allowed length 28 in the set by 3. This example demonstrates then that some embodiments may be applicable to still pad identifiers with lengths in the middle 40M of the distribution 40, but just pad them to a lesser extent than identifiers with lengths in other parts of the distribution 40 (e.g., the tails 40L, 40U).

Figure 5D:
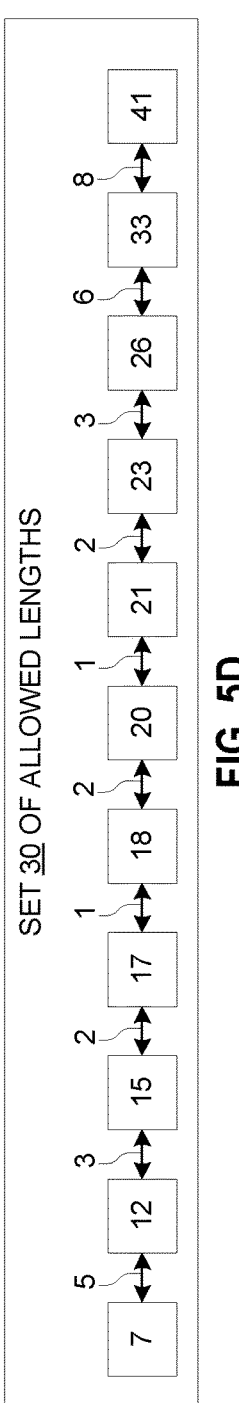
FIG. 5D is a block diagram of a set of allowed lengths according to still other embodiments.

Although in the above examples the at least two allowed lengths that differ from the next shortest or longest allowed length in the set 30 by the common length difference occur next to one another in the set 30, such need not be the case. FIG. 5D illustrates one example.

As shown in FIG. 5C, the set 30 of allowed lengths includes {7, 12, 15, 17, 18, 20, 21, 23, 26, 33, and 41}. In this case, for each of the allowed lengths 17, 18, 20, and 21, that allowed length differs from the next shortest or longest allowed length in the set 30 by a common length difference $D-C=1$. Indeed, allowed length 17 differs from the next longest length 18 by 1, allowed length 18 differs from the next shortest length 17 by 1, allowed length 20 differs from the next longest allowed length 21 by 1, and allowed length 21 differs from the next shortest length 20 by 1. Notably, though, allowed length 21 is the longest allowed length among these allowed lengths. And allowed length 21 differs from the next longest allowed length 23 in the set 30 by more than 1, i.e., since allowed length 21 differs from the next longest allowed length 23 in the set by 2. Or, seen from another perspective, for each of the allowed lengths 15, 17, 18, 20, 21, and 23, that allowed length differs from the next shortest or longest allowed length in the set 30 by a common length difference $D-C=2$. Indeed, allowed length 15 differs from the next longest length 17 by 2, allowed length 17 differs from the next shortest length 15 by 2, allowed length 18 differs from the next longest allowed length 20 by 2, allowed length 20 differs from the next shortest allowed length 18 by 2, allowed length 21 differs from the next longest allowed length 23 by 2, and allowed length 23 differs from the next shortest allowed length 21 by 2. Notably, though, allowed length 23 is the longest allowed length among these allowed lengths. And allowed length 23 differs from the next longest allowed length 26 in the set 30 by more than 1, i.e., since allowed length 23 differs from the next longest allowed length 26 in the set by 3. Again this example demonstrates that some embodiments may be applicable to still pad identifiers with lengths in the middle 40M of the distribution 40, but just pad them to a lesser extent than identifiers with lengths in other parts of the distribution 40 (e.g., the tails 40L, 40U).

Figure 6A:
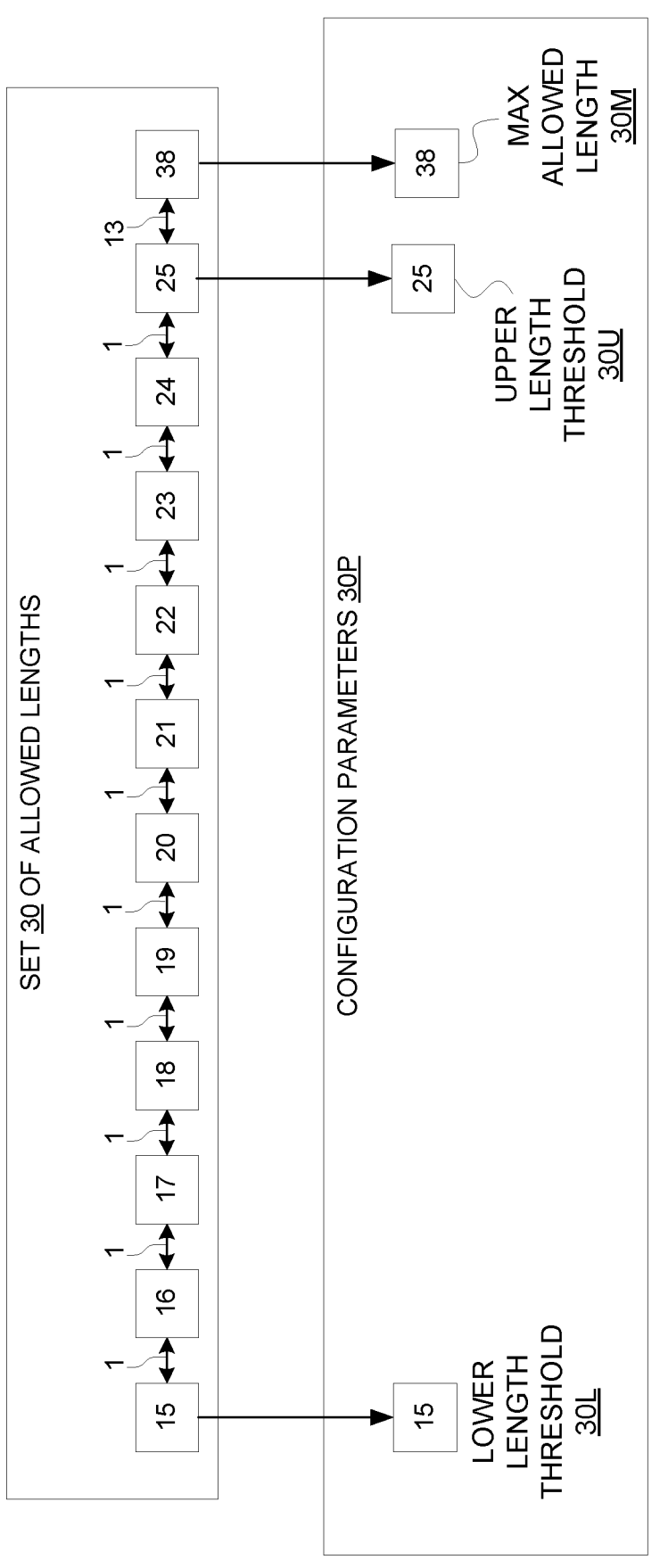
FIG. 6A is a block diagram of a set of allowed lengths according to other embodiments.

In any event, FIG. 6A shows one example of how the set 30 of allowed lengths may be implemented, configured, and/or signaled according to some embodiments, e.g., where the set 30 of allowed lengths is similar to the set 30 shown in FIG. 4A. As shown in FIG. 6A, the set 30 of allowed lengths may be represented by configuration parameters 30P that include a lower length threshold 30L, an upper length threshold 30U, and a maximum allowed length 30M. Here, the upper length threshold 30U may differ from the maximum allowed length 30M by more than the common length difference (e.g., by more than 1).

In one or more of these embodiments, the set 30 of allowed lengths comprises a range of consecutive lengths between the lower length threshold 30L and the upper length threshold 30U, where each allowed length in the range of consecutive lengths differs from the next shortest or longest allowed length in the set by the common length difference (e.g., 1). For example, the range as represented by the lower and upper length thresholds 30L, 30U may reflect allowed lengths in the middle of the distribution 40.

In these and other embodiments, then, if the length of the communication identifier 16 is less than the lower length threshold 30L, the communication equipment 20 determines an extent to which the communication identifier 16 is to be padded in order for the communication identifier 16 to have a length equal to the lower length threshold 30L. If the length of the communication identifier 16 is greater than the upper length threshold 30U, the communication equipment 20 determines an extent to which the communication identifier 16 is to be padded in order for the communication identifier 16 to have a length equal to the maximum allowed length 30M. And if the length of the communication identifier 16 is greater than or equal to the lower length threshold 30L and is less than or equal to the upper length threshold 30U, the communication equipment 20 determines that the communication identifier 16 need not be padded to any extent in order for the communication identifier 16 to have a length that is included in the set 30 of allowed lengths.

Figure 6B:
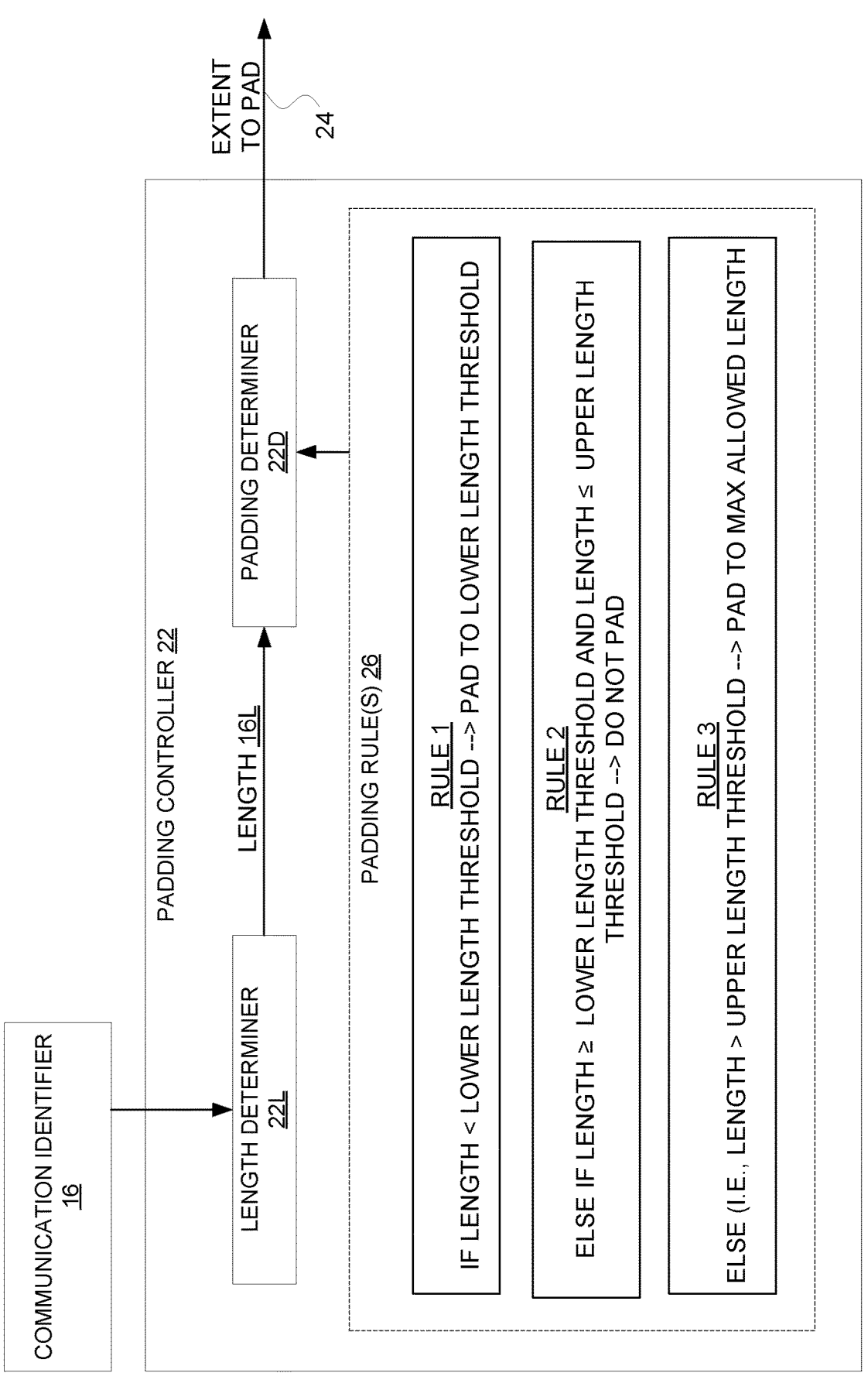
FIG. 6B is a block diagram of a padding controller according to some embodiments.

FIG. 6B shows then that, in some embodiments, the padding controller 22 from FIG. 1 may implement padding rule(s) 26 that are specified in terms of the lower length threshold 30L, the upper length threshold 30U, and the maximum allowed length 30M. As shown, Rule 1 may specify that if the length of the communication identifier 16 is less than the lower length threshold 30L, the communication identifier 16 is to be padded to the lower length threshold 30L. Rule 2 may specify that, otherwise, if the length of the communication identifier 16 is greater than or equal to the lower length threshold 30L and less than or equal to the upper length threshold 30U, the communication identifier 16 is not to be padded to any extent. Rule 3 may specify that, otherwise, i.e., if the length of the communication identifier 16 is greater than the upper length threshold 30U, the communication identifier 16 is to be padded to the maximum allowed length 30M. Configured with these Rules 1-3, then, the padding controller 22 as shown includes a length determiner 22L that determines the length 16L of the communication identifier 16 and also includes a padding determiner 22D that determines, based on that length 16L and on the padding Rules 1-3, the extent 24 to which to pad the communication identifier 16.

In some embodiments, the communication equipment 22 may be preconfigured with the padding rule(s) 26, e.g., by being preconfigured with the lower length threshold 30L, the upper length threshold 30U, and/or the maximum allowed length 30M. For example, at least one of the lower length threshold 30L, the upper length threshold 30U, and the maximum allowed length 30M may be preconfigured on an integrated circuit card that is embedded in or removably inserted in the communication equipment 20. Alternatively or additionally, the communication equipment 20 may receive, from a network node, signaling indicating the lower length threshold 30L and/or the upper length threshold 30U and/or the maximum allowed length 30M. In some embodiments, then, where the thresholds 30L, 30U and the maximum allowed length 30M represent the set 30 of allowed lengths, the communication equipment 20 may receive signaling, from network equipment, indicating the set 30 of allowed lengths, e.g., where the signaling indicates the set 30 by indicating the thresholds 30L, 30U and the maximum allowed length 30M.

Figure 7:
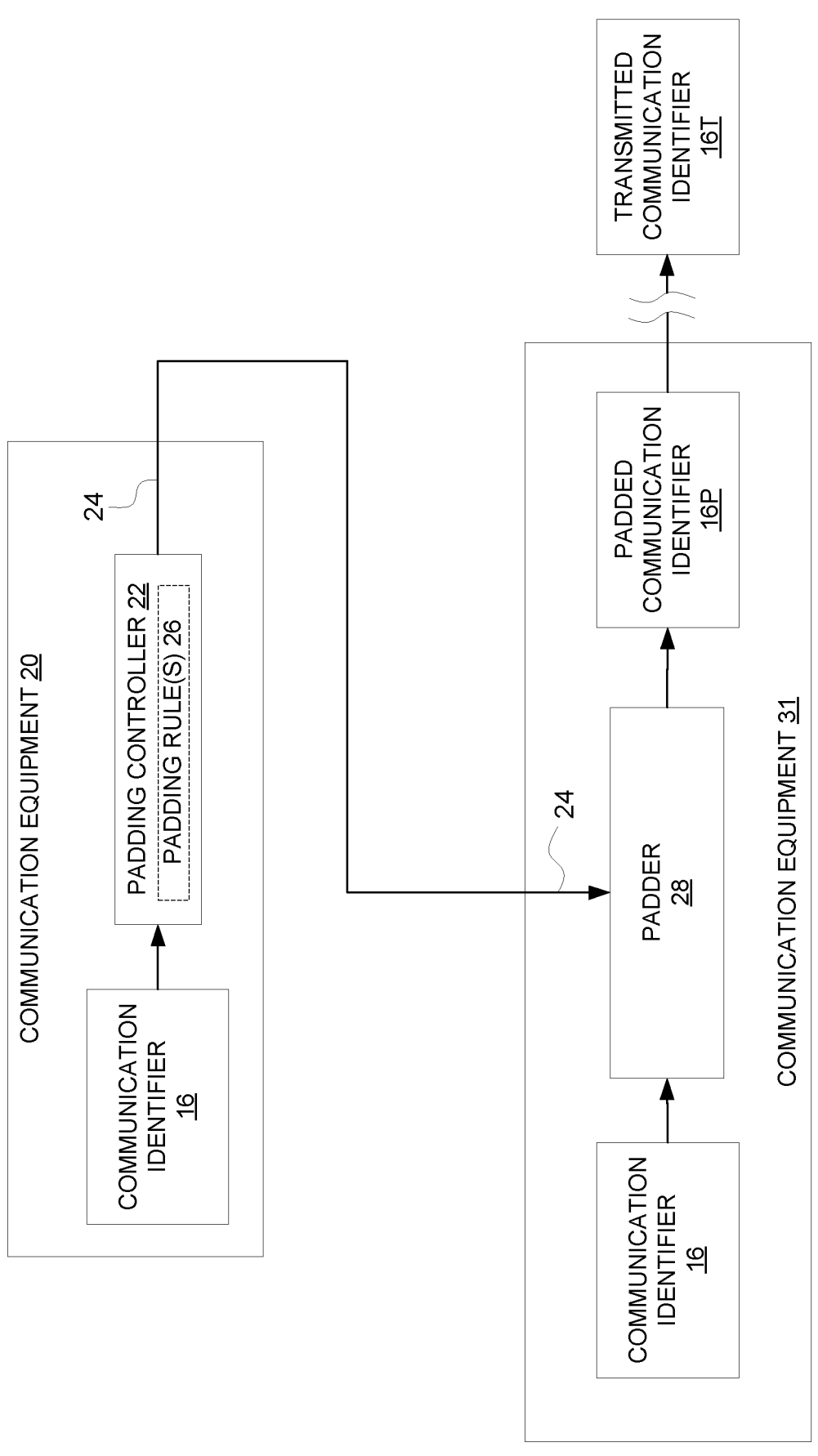
FIG. 7 is a block diagram of communication equipment according to some embodiments.

Although FIG. 1 shows the communication equipment 20 itself performing padding of the communication identifier 16 according to the determined extent, in other embodiments the communication equipment 20 assists other communication equipment to perform such padding. FIG. 7 shows an example. As shown in FIG. 7, the communication equipment 20 determines the extent 24 to which the communication identifier 16 is to be padded, as described above. The communication equipment 20 then assists other communication equipment 31 to perform padding of the communication identifier 16 to that determined extent 24, e.g., by signaling the determined extent 24 to the other communication equipment 31.

Figure 8:
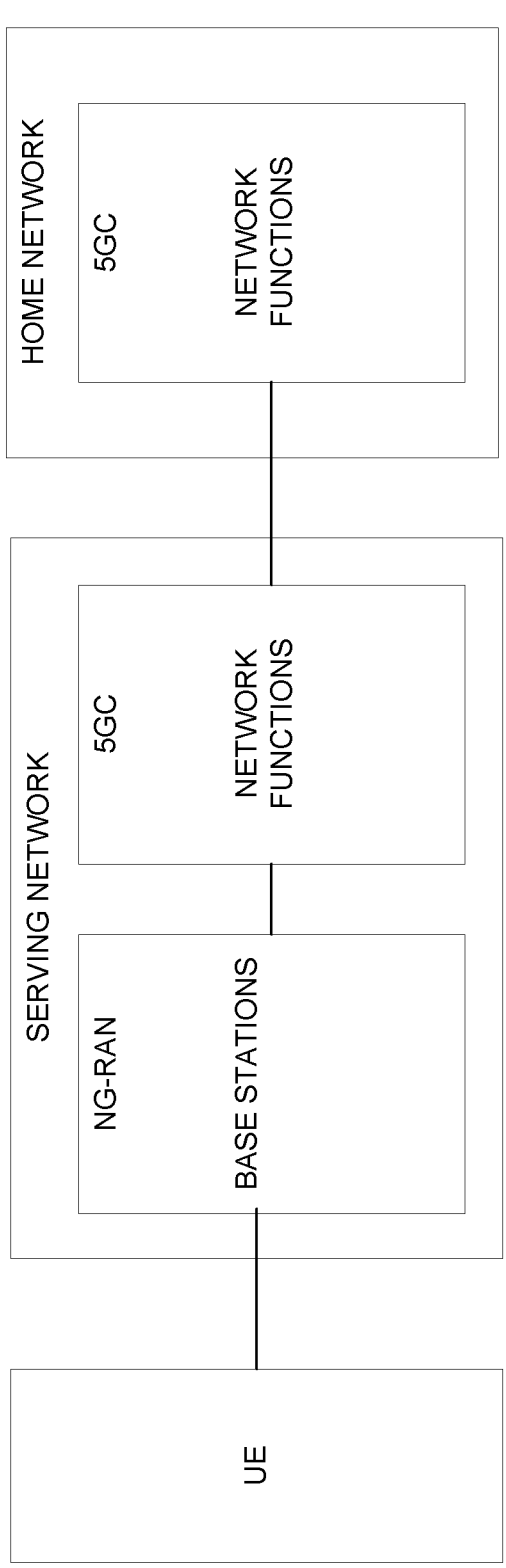
FIG. 8 is a block diagram of a 5G network according to some embodiments.

Consider now an example context in which some embodiments herein may be applied. Some embodiments may be applied in a wireless communication network, e.g., a 5G network. 5G is the fifth generation of mobile networks standardized by 3GPP. A simplistic illustration of a 5G network is shown in FIG. 8.

User Equipment (UE) is a wireless device used to access the network. It is typically a mobile phone but can also be a wireless router or an Internet of Things (IoT) sensor. Next-Generation Radio Access Network (NG-RAN) comprises radio base stations that provide wireless access to the UEs. 5G Core (5GC) comprises network functions with various responsibilities like authenticating UEs or routing UEs' Internet traffic.

In case of roaming, the 5GC network functions are distributed among Serving and Home networks. The Home network is the one with which users have mobile subscription; the Serving network is the one that is serving the users. When there is no roaming, Serving and Home networks are the same.

Additional details of the 5G network are found in 3GPP technical specifications (TS) 23.501 V17.0.0, 23.502 V17.0.0, and 38.401 V16.3.0.

5G Subscription Permanent Identifier (SUPI)

Each subscription in a 5G network is identified by a unique long-term identifier called the Subscription Permanent Identifier (SUPI). The exact definitions of SUPI can be found in 3GPP TS 23.003 V17.1.0. The SUPI contains the following parts:

$$SUPI = SUPI \text{ type} \,\|\, SUPI \text{ value}$$

The SUPI type can be al International Mobile Subscriber Identity (IMSI) or Network Specific Identifier (NSI). In either case, the SUPI value consists of a home network identifier and a subscription identifier. In the future, other SUPI types may be defined.

When the SUPI is of type IMSI, the SUPI value consists of a 3-digit Mobile Country Code (MCC), a 2-3 digit Mobile Network Code (MNC), and a 9-10 digit subscription identifier called Mobile Sub-scription Identification Number (MSIN). The MCC and MNC identify the mobile network operator and the MSIN identifies the subscription. The lengths of MNC and MSIN are fixed for a given MCC. An IMSI has the following format:

$$IMSI = MCC \,\|\, MNC \,\|\, MSIN$$

When the SUPI is of type NSI, the SUPI value consists of a Network Access Identifier (NAI) as defined in IETF RFC 7542. An NAI consists of a variable length UTF-8 encoded string called the realm identifying the network, and a variable length UTF-8 encoded string called the username identifying the subscription. An NAI is similar but a bit more restrictive than an email address. While an NAI can contain any international Unicode characters, NAIs are often restricted to ASCII characters also in non-English speaking countries. An NAI has the following format:

$$NAI = username @ realm$$

5G Subscription Concealed Identifier (SUCI)

SUCI as specified by 3GPP TS 33.501 V17.1.0 and 23.003 V17.1.0 is constructed from the following fields:

$$SUCI = SUPI \text{ type } \| \text{ Home Network Identifier } \|$$
$$\text{other parameters } \| \text{ Concealed subscription identifier}$$

The Home network configures the UE with its public keys and the asymmetric protection scheme to generate SUCI. 3GPP has standardized three protection schemes: (1) Null-scheme; (2) Profile A; and (3) Profile B.

Besides the above three schemes, 3GPP has reserved 9 placeholders for identifying concealment schemes to be standardized in future.

The Null-scheme does not do any actual encryption, rather produces the same output as the input. It effectively means that a SUCI calculated using the null-scheme will comprise the information in SUPI in clear-text over-the-air. The null-scheme is meant to be used until operators have configured encryption parameters in the UEs and are used in early 5G deployments.

Figure 9:
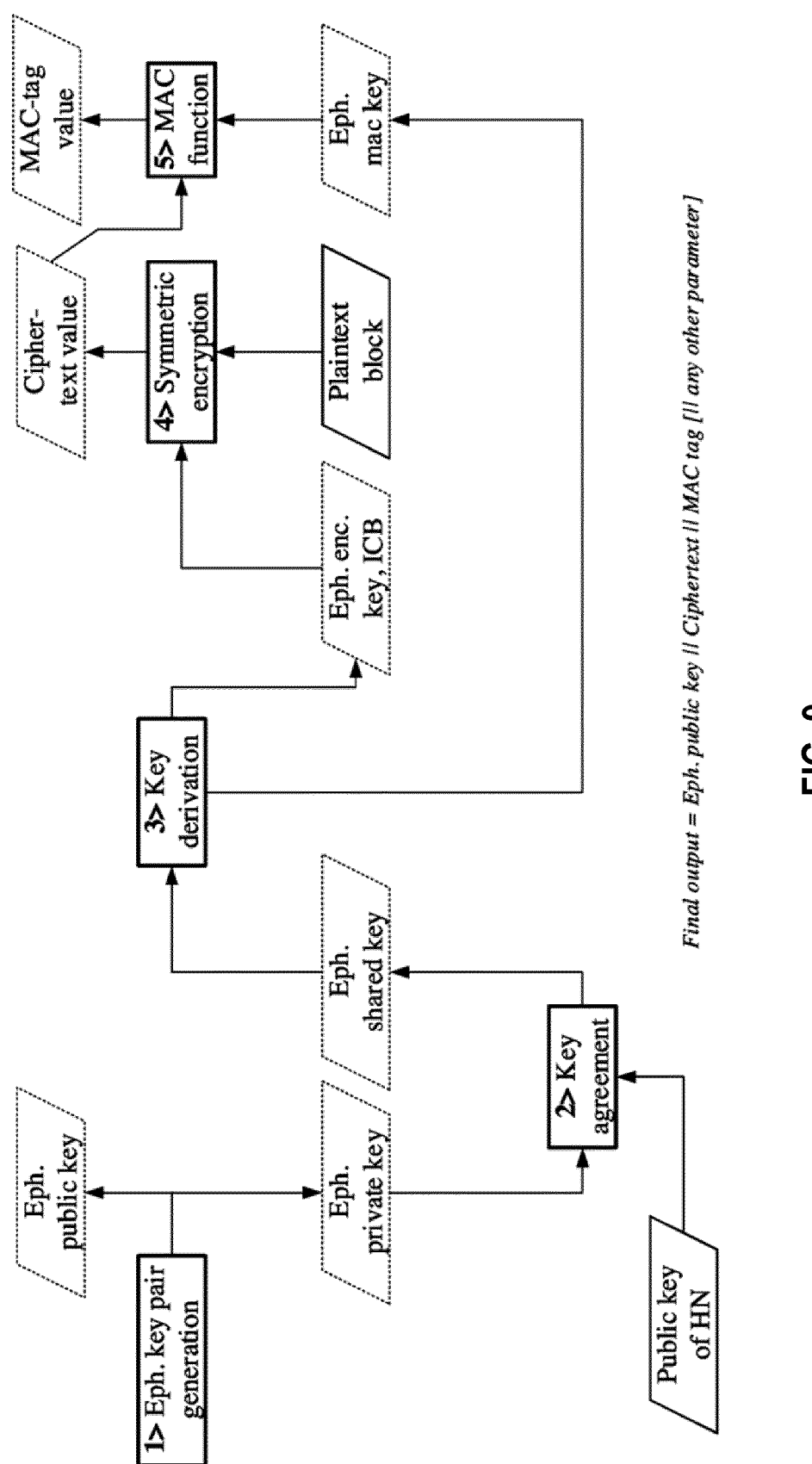
FIG. 9 is a block diagram of how an Elliptic Curve Integrated Encryption Scheme (ECIES) produces a SUCI according to some embodiments.

The Profile A and B are based on Elliptic Curve Integrated Encryption Scheme (ECIES). Mechanisms of how ECIES produces SUCI is shown in FIG. 9. The elliptic curves in Profile A and B are respectively Curve25519 and secp256r1. In both, the symmetric encryption algorithm AES-128 is in counter (CTR) mode.

Padding SUCI

SUCI uses AES-128 in CTR mode and guarantees that even a very capable theoretical attacker cannot distinguish the encrypted ciphertext from a random string. But this guaranteeing assumes fixed lengths plaintexts, and if this is not true, then the indistinguishability is broken. SUCI provides indistinguishability when the SUPI is of type IMSI, where the MSIN has a fixed length for a given MCC. But when the SUPI type is NSI, the username is variable in length and indistinguishability no longer holds. An attacker would get perfect information regarding the length of the username.

In other words, when applied to NSI type identifier, SUCI heretofore provides very poor K-anonymity for some of the users with unusual identifier lengths, especially, very short or very long names. A data set has K-anonymity if the information for each person contained in the release cannot be distinguished from at least K−1 individuals whose information also appear in the release. K-anonymity is sometimes referred to as a "hiding in the crowd" guarantee; any of the K records in the group could correspond to a single person.

Figure 10:
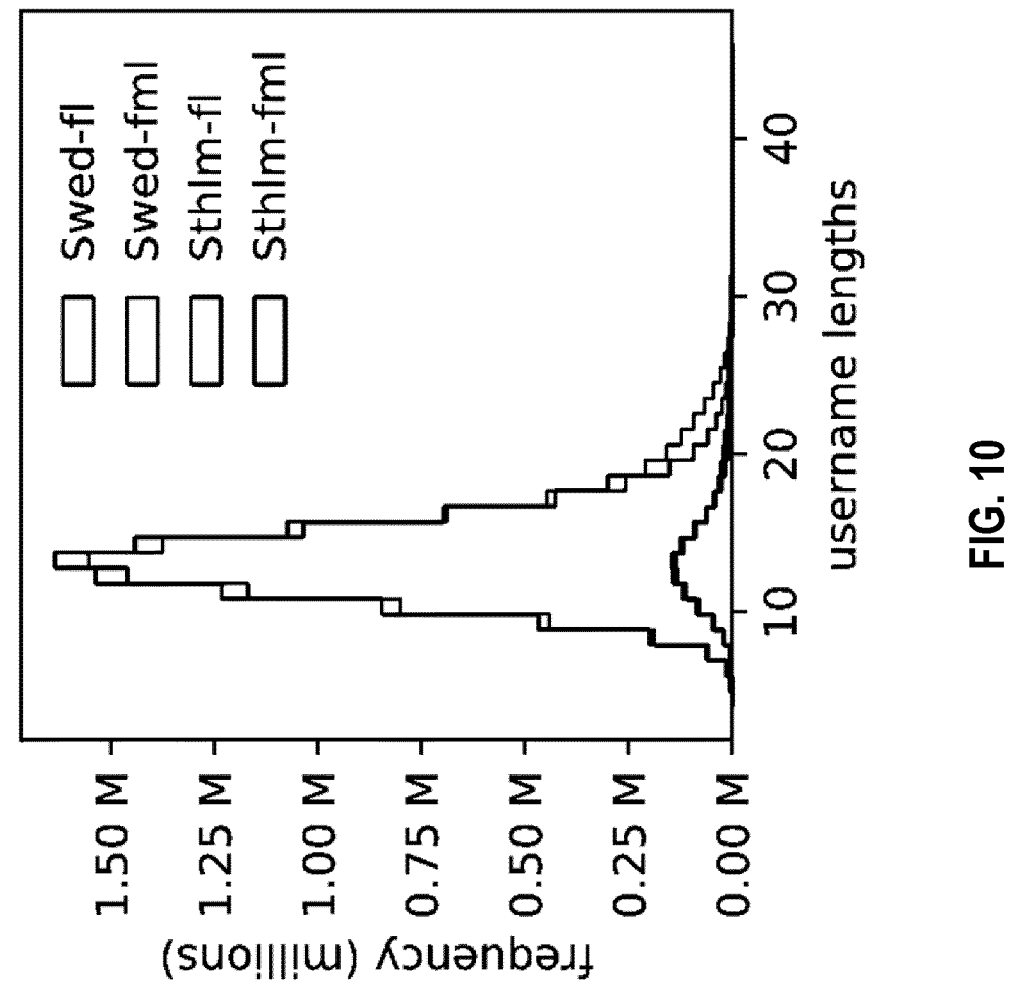
FIG. 10 is a histogram of name lengths for the whole of Sweden as well as Stockholm Municipality.

Consider FIG. 10 which shows a histogram of name lengths for the whole of Sweden as well as Stockholm Municipality. The data refers to the Swedish population register on 31 Dec. 2019 and was obtained from government agency Statistics Sweden called Statistiska centralbyrån, SCB. When considering the Sweden-fl data, with the population of 10 million people, it is a reasonable data set to analyze the subscriber privacy of a medium size mobile operator that uses the same realm for all subscribers. In this case, SUCI protection heretofore only achieves 3-anonymity. The given anonymity is likely even worse as the numbers for largest length in these datasets are known to be incorrect and a correct dataset would likely only provide 1-anonymity. 1-anonymity means that an attacker can trivially track at least one of the users. 1-anonymity also means that an attacker with access to the data set of real names can trivially identify at least one of the users.

In this context, some embodiments herein pad SUPIs taking into account the bandwidth cost introduced by the padding, where here a SUPI exemplifies the communication identifier 16 herein. The bandwidth cost function may be calculated as the average increase in message size as a weighted sum of all the padded lengths normalized by the unpadded cost. When applying the known padding methods to the Sweden-fl data discussed above, the plots shown in FIG. 11 result. On the x-axis is the bandwidth cost, and on the y-axis is the k-anonymity (logarithm of base 10). The maximum achievable value for k is the population size and is shown in the horizontal dashed line. Lower bandwidth is better. Higher k-anonymity is better. The rightmost plot is just a zoom-in of the leftmost plot, where the bandwidth cost is limited from 1 to 2.

Figure 11:
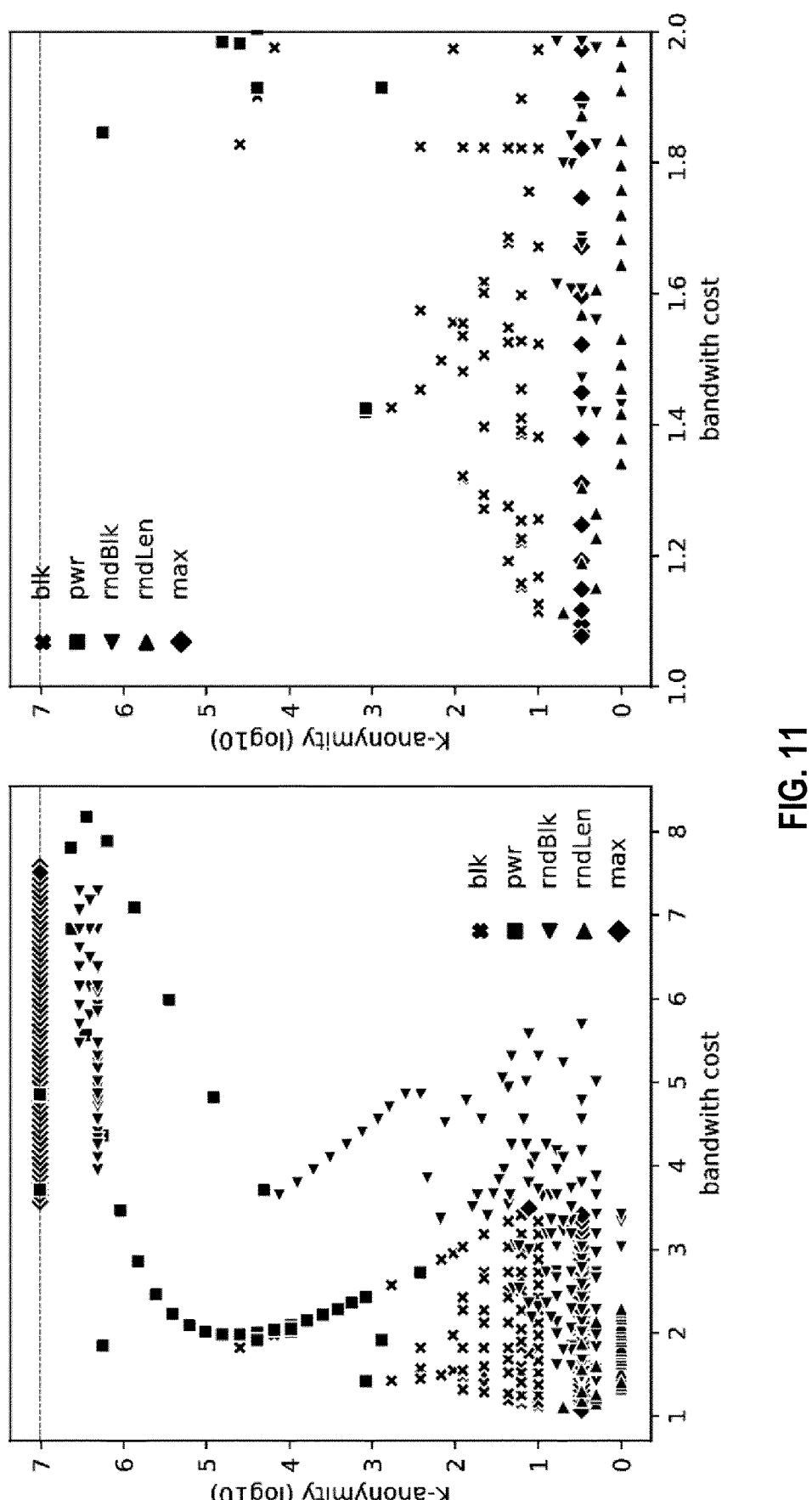
FIG. 11 is a chart showing results of applying known padding methods to the Sweden-fl data.

As seen from FIG. 11, although the known padding methods can in principle achieve better k-anonymities, they impose a high increase in bandwidth cost. Such increase in bandwidth cost is undesirable when it comes to mobile networks because radio resource should be preserved for other functionalities related to providing connectivity.

Known padding methods perform padding by dividing the x-axis of the histogram into regions based on a simple mathematical formula. The reason that these padding methods are inefficient in raising k-anonymity without heavily raising bandwidth in practice with distributions such as the normal distribution, the binomial distribution, and the distribution or real-world names is that the known padding methods provide a large amount of padding to regions of the histogram with a large number of users. These regions are therefore not the regions of lengths that determine the k-anonymity as the k-anonymity is determined by the worst anonymized lengths. I.e., the lengths with the fewest users (the lowest frequency). While for example, block-length padding allows the set a long block length for the left tail, doing the same for the right tail also increases the block length for the middle of the distribution which heavily increases the bandwidth without necessarily increasing the k-anonymity at all.

Some embodiments herein, by contrast, divide the y-axis into blocks so that regions with low frequency get more padding while regions with high frequency get less padding or no padding at all. For most common statistical distributions this means providing most padding to the tails, and very little or no padding to the middle. The division into blocks could be determined from the exact distribution or an expected distribution such as the normal distribution or the public real-name distribution of Sweden shown in FIG. 10. To determine a good division into blocks, a tradeoff still has to be done between bandwidth and k-anonymity. In the two extreme cases the chosen padding method can minimize bandwidth given a fixed k-anonymity, alternatively the chosen padding method can maximize k-anonymity given fixed bandwidth. In general, a specific instance of some embodiments can be described with any data set that divides the y-axis into regions such that regions with low frequencies have larger block sizes than regions with high frequencies. Note that a block size of 1 corresponds to no padding, i.e., zero bytes of padding.

Two exemplary ways to represent such a padding would be an ordered list of the block sizes:

7, 5, 3, 1, 1, 1, 1, 1, 3, 6, 8

Or equivalently an ordered list of the sizes that the data will have after padding, i.e., an ordered list of the allowed lengths.

7, 12, 15, 16, 17, 18, 19, 20, 23, 29, 37

Both of the above representations mean that data with length 1-7 are padded to length 7, data with length 8-12 are padded to length 12, data with length 13-15 are padded to length 15, data with length 16 are padded to length 16 (i.e., no padding), etc.

The above representations assume that the empty byte string is not a valid string, but some might allow that. In such an implementation the second list would be shifted one step to the left. i.e., 6, 11, 14, 15, 16, etc.

For many common distributions, it is optimal in terms of k-anonymity and bandwidth to not pad the middle of the y-axis at all, i.e., a block size of 1 is applied to the middle region. Such paddings can be described by only the blocks with size larger than 1. The right block needs to cover the maximum lengths possible in the data. For example,

[0, 15], [26, 38]

describes a padding where data of length less than 15 is padded to 15, data of length 26 or larger is padded to 38 bytes of length and data with lengths 16-15 is not padded at all.

Appropriately, then, some embodiments herein may be terms taBlk (tail-aware block-length padding).

For some distributions, one big block for each tail is enough to get a very efficient padding, but for distributions with high variance more blocks might be optimal, and for skew distributions it might be optimal to have a different amount on blocks on the left and right tail. For example:

[0, 7], [8, 11], [26, 28], [29, 34], [35, 64]

As an implementation optimization, the common borders between blocks can be omitted. As an implementation optimization, known minimum and maximum lengths can also be omitted. For example, if the maximum length 64 is known, the padding above could be represented with only five numbers as:

(7, 11), (26, 28, 34)

And if 64 is not known, it could be represented as (7, 11), (26, 28, 34, 64)

In some embodiments, the tails of a distribution are the ones where there are fewer occurrences (meaning lower k-anonymity), and which benefit from padding the most. The ones in the middle are already sufficiently better with respect to k-anonymity.

Figure 12:
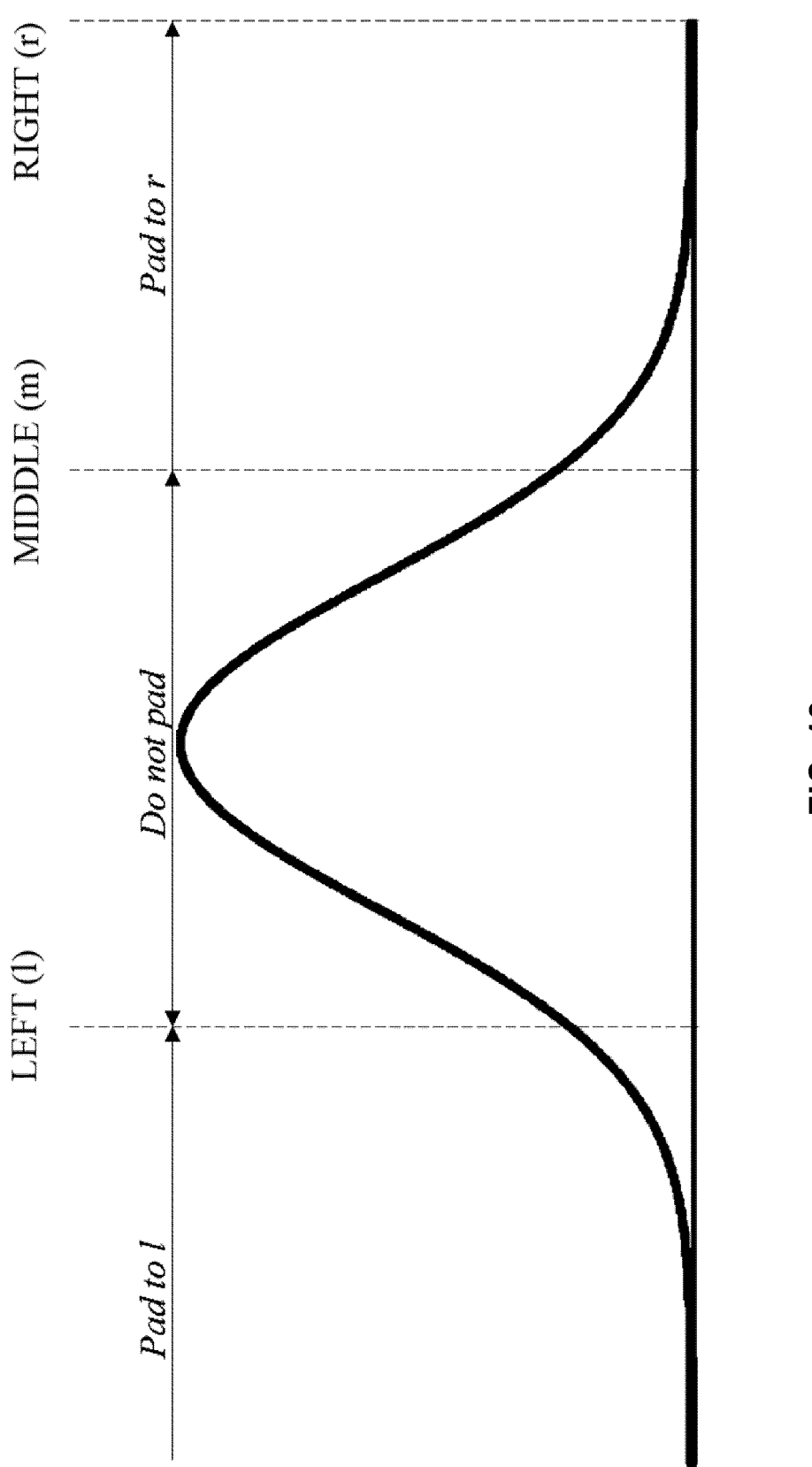
FIG. 12 is a block diagram showing communication identifier padding according to some embodiments herein.

Therefore, in some embodiments, padding is done as follows. Lengths below a threshold LEFT (l) are padded to l. Lengths between l and MIDDLE (m) are not padded. And lengths above m are padded to RIGHT (r). FIG. 12 illustrates this graphically.

Certain embodiments may provide one or more of the following technical advantage(s). Some embodiments enable achieving higher k-anonymity while keeping the bandwidth cost low. Therefore, better privacy can be achieved without over utilizing valuable radio resources.

Figure 13:
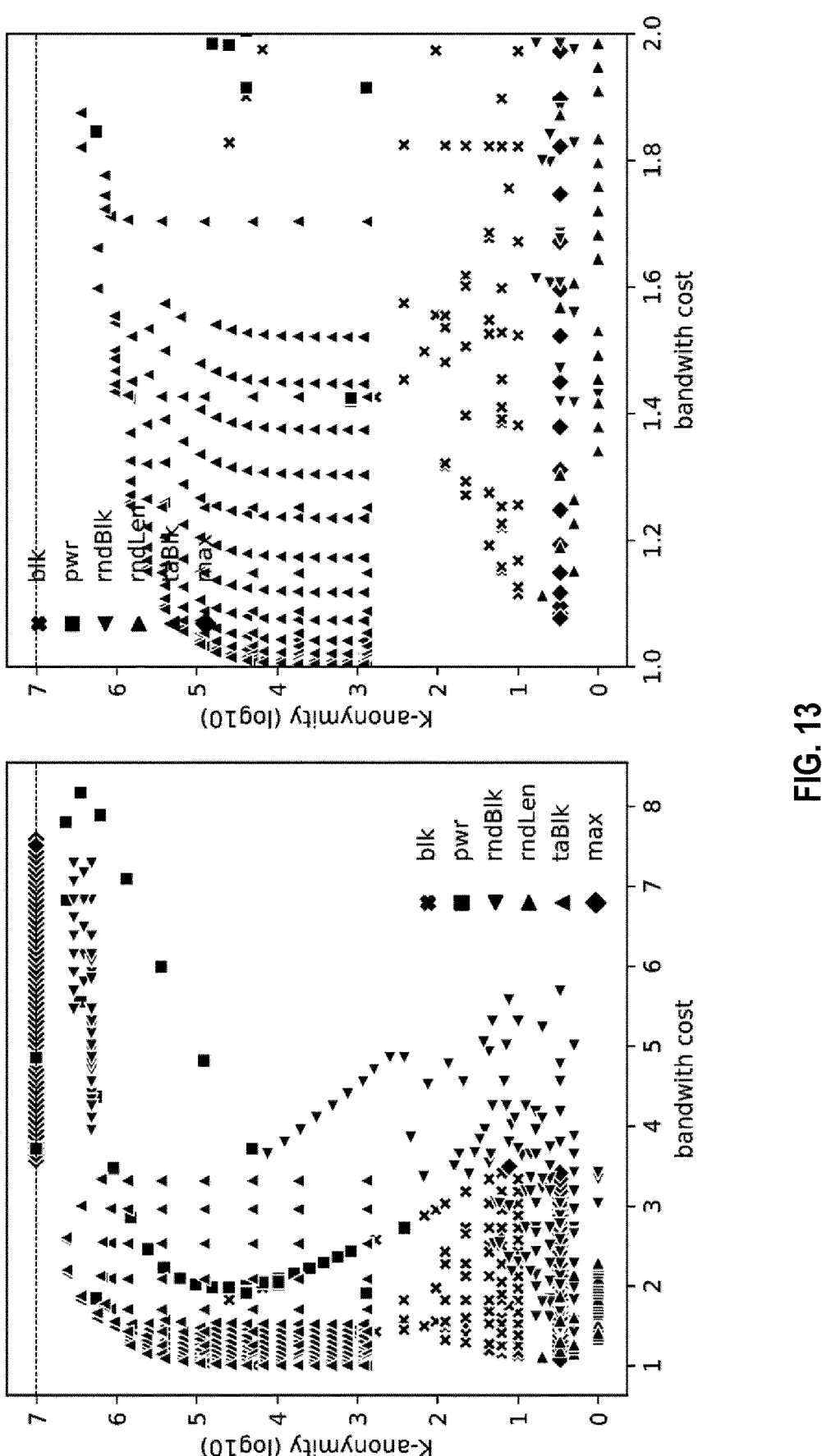
FIG. 13 is a chart showing results of applying known padding methods and applying some embodiments herein to the Sweden-fl data.

FIG. 13 shows that some embodiments (shown as taBlk) achieve better k-anonymity at lower bandwidth cost. The taBlk in FIG. 13 follows the LEFT, MIDDLE, RIGHT embodiment. The rightmost plot is just a zoom-in of the leftmost plot where the bandwidth cost is limited from 1 to 2.

Figure 14:
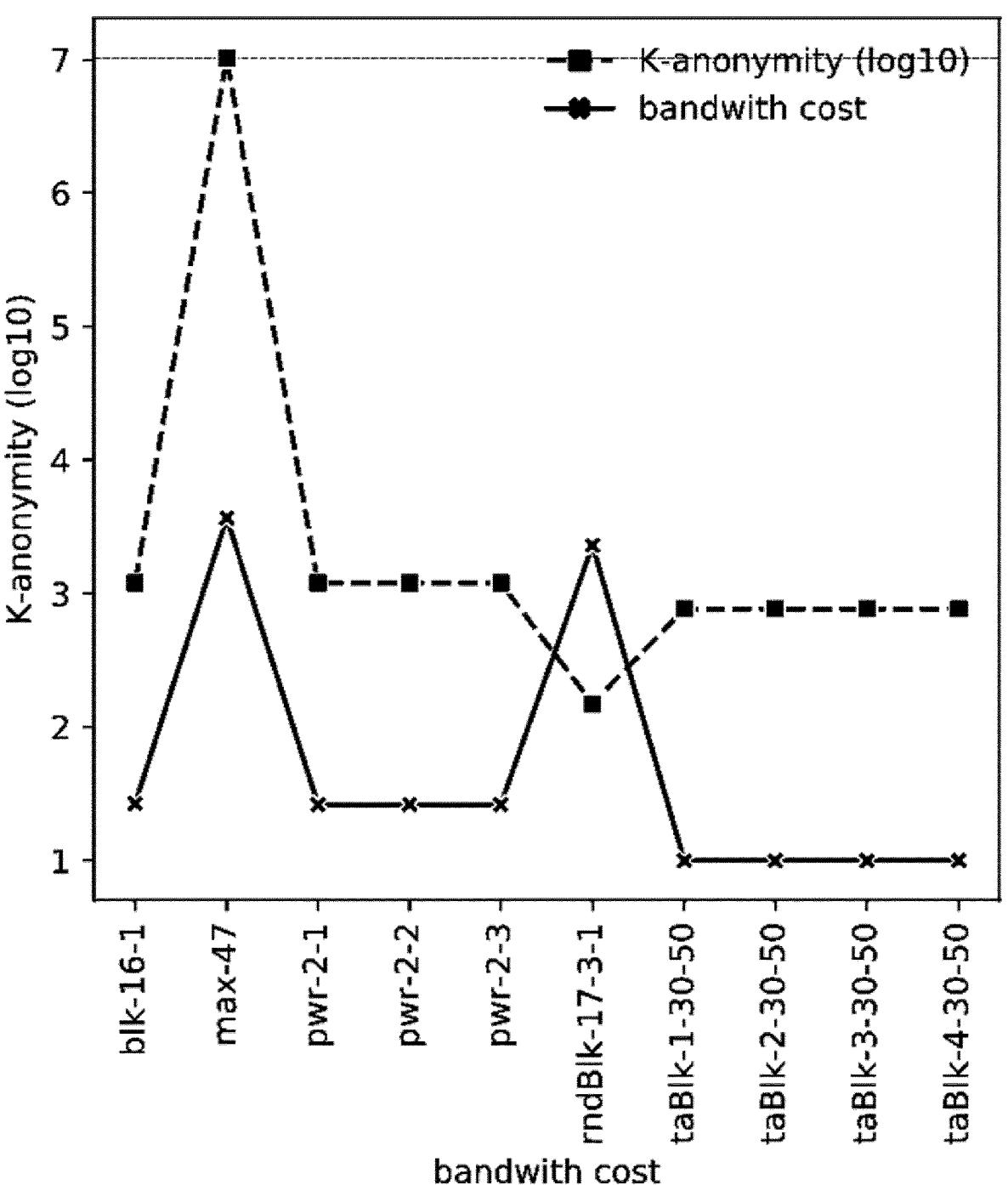
FIG. 14 is another chart showing results of applying known padding methods and applying some embodiments herein to the Sweden-fl data.

FIG. 14 shows another plot on the Sweden-fl data, which shows lowest bandwidth cost required by various padding methods to achieve k-anonymity>=100. Some embodiments thereby surpass all other known padding methods in keeping the bandwidth cost low.

In this context, some embodiments include a method performed by a UE or a network for padding at least part of a SUPI. The method comprises determining a length of padding based on the length of the at least part of the SUPI before padding. In one embodiment, a mapping indicates the length of padding. For example, where SUPIs as a whole are padded, the mapping may be a dictionary{X:Xp, Y:Yp}, which means pad SUPIs of length X to Xp, and Y to Yp. In another example, the mapping may be reflected by an array [Xp,Yp,Zp] using an index (e.g., starting at 0), which means pad SUPIs of length 0 to Xp, 1 to Yp, and 2 to Zp. In one embodiment, the method uses a LEFT, a MIDDLE, and a RIGHT threshold. For example, where SUPIs as a whole are padded, (i) pad SUPIs of length<LEFT to LEFT; (ii) do not pad SUPIs of length>=LEFT and length<=MIDDLE; and (iii) pad SUPIs of length>MIDDLE to RIGHT.

In any of these embodiments, the UE may be Universal Subscriber Identity Module (USIM) or Mobile Equipment (ME). Alternatively or additionally, the network may be Unified Data Management (UDM) or Authentication Server Function (AUSF) or Home Subscriber Server (HSS).

5GC can be deployed in cloud. So, when used by 5GC, some embodiments may be implemented in the cloud.

In view of the above modifications and variations, FIG. 15 depicts a method performed by communication equipment 20 configured for use in a communication network 10 in accordance with particular embodiments. The method includes determining an extent 24 to which a communication identifier 16 for the communication network 10 is to be padded in order for the communication identifier 16 to have a length that is included in a set 30 of allowed lengths (Block 1500). For each of at least two allowed lengths in the set 30, the allowed length differs from the next shortest or longest allowed length in the set 30 by a common length difference D–C. The longest allowed length among said at least two allowed lengths differs from the next longest allowed length in the set 30 by more than the common length difference D–C.

The method further comprises performing, or assisting other communication equipment 31 to perform, padding of the communication identifier 16 to the determined extent 24 (Block 1510).

In some embodiments, the method also comprises encrypting the communication identifier, as padded to the determined extent 24 (Block 1520).

In some embodiments, the method further comprises transmitting the encrypted communication identifier (Block 1530).

In some embodiments, the common length difference is equal to 1 such that, for each of said at least two allowed lengths in the set 30, the allowed length differs from the next shortest or longest allowed length in the set by 1.

In some embodiments, the shortest allowed length among said at least two allowed lengths is the shortest allowed length in the set 30 of allowed lengths.

In some embodiments, the shortest allowed length among said at least two allowed lengths is longer than the shortest allowed length in the set 30 of allowed lengths.

In some embodiments, the shortest allowed length among said at least two allowed lengths differs from the next longest allowed length in the set 30 by the common length difference D–C.

In some embodiments, the longest allowed length among said at least two allowed lengths differs from the next shortest allowed length in the set 30 by the common length difference D–C.

In some embodiments, the next longest allowed length from which the longest allowed length among said at least two allowed lengths differs by more than the common length difference D–C is the longest allowed length in the set 30.

In some embodiments, the set 30 of allowed lengths comprises a range of consecutive lengths between a lower length threshold 30L and an upper length threshold 30U, wherein each allowed length in the range of consecutive lengths differs from the next shortest or longest allowed length in the set by 1. The set 30 of allowed lengths may further comprise a maximum allowed length 30M, wherein the longest allowed length in the range differs from the maximum allowed length 30M by more than 1.

In one such embodiment, determining the extent 24 to which a communication identifier 16 for the communication network 10 is to be padded may comprise the following. If the length of the communication identifier 16 is less than the lower length threshold 30L, the communication equipment 20 determines an extent to which the communication identifier 16 is to be padded in order for the communication identifier 16 to have a length equal to the lower length threshold 30L. If the length of the communication identifier 16 is greater than the upper length threshold 30U, the communication equipment 20 determines an extent to which the communication identifier 16 is to be padded in order for the communication identifier 16 to have a length equal to the maximum allowed length 30M. If the length of the communication identifier 16 is greater than or equal to the lower length threshold 30L and is less than or equal to the upper length threshold 30U, the communication equipment 20 determines that the communication identifier 16 need not be padded to any extent in order for the communication identifier 16 to have a length that is included in the set 30 of allowed lengths.

In one or more of these embodiments, the method further comprises receiving, from a network node, signaling indicating the lower length threshold 30L and/or the upper length threshold 30U and/or the maximum allowed length 30M. In other embodiments, at least one of the lower length threshold 30L, the upper length threshold 30U, and the maximum allowed length 30M is preconfigured at the communication equipment 20 or is preconfigured on an integrated circuit card that is embedded in or removably inserted in the communication equipment 20.

In some embodiments, the encrypted communication identifier 16 is a Subscription Concealed Identifier, SUCI.

In some embodiments, said assisting comprises transmitting, to the other communication equipment 20, signaling indicating the determined extent 24 to which the communication identifier 16 is to be padded.

In some embodiments, the communication equipment 20 is core network equipment. Alternatively or additionally, in some embodiments, the other communication equipment is a wireless device 12.

In other embodiments, the communication equipment 20 is a wireless device 12. In one such embodiment, said performing or assisting comprises performing padding of the communication identifier 16 to the determined extent 24. In one or more of these embodiments, the method further comprises receiving, from core network equipment, signaling indicating the set 30 of allowed lengths. The signaling may for example indicate the set of allowed lengths by indicating a lower length threshold 30L representing the shortest allowed length among said at least two allowed lengths in the set 30, by indicating an upper length threshold 30U representing the longest allowed length among said at least two allowed lengths in the set 30, and by indicating the longest allowed length in the set 30. In one or more of these embodiments, the method further comprises transmitting, to a network node, signaling indicating a scheme according to which the wireless device 12 has padded the communication identifier 16.

FIG. 16 depicts a method performed by communication equipment 20 configured for use in a communication network 10 in accordance with other particular embodiments. In some embodiments, the method comprises selectively padding a communication identifier 16 for the communication network 10 according to one or more rules 26 (Block 1610). According to the one or more rules, if the length of the communication identifier 16 is less than a lower length threshold 30L, the communication identifier 16 is to be padded to the lower length threshold 30L. If the length of the communication identifier 16 is greater than an upper length threshold 30U, the communication identifier 16 is to be padded to a maximum padded length 30M. Here, the maximum padded length 30M is greater than the upper length threshold 30U. If the length of the communication identifier 16 is greater than or equal to the lower length threshold 30L and is less than or equal to the upper length threshold 30U, the communication identifier 16 is not to be padded.

In some embodiments, the method alternatively or additionally comprises receiving signaling indicating a lower length threshold 30L and/or an upper length threshold 30U (Block 1600). A communication identifier 16 with a length below the lower length threshold 30L is to be padded to the lower length threshold 30L. A communication identifier 16 with a length above the upper length threshold 30U is to be padded to a maximum padded length 30M. A communication identifier 16 with a length between the lower length threshold 30L and the upper length threshold 30U is not to be padded.

In some embodiments, the method may further comprise encrypting the communication identifier as selectively padded (Block 1620).

In some embodiments, the method may further comprise transmitting the encrypted communication identifier (Block 1630).

FIG. 17A depicts a method performed by a network node configured for use in a communication network 10 in accordance with other particular embodiments. In some embodiments, the method comprises transmitting, to communication equipment 20, signaling indicating a lower length threshold 30L and/or an upper length threshold 30U (Block 1700). A communication identifier 16 with a length below the lower length threshold 30L is to be padded to the lower length threshold 30L. A communication identifier 16 with a length above the upper length threshold 30U is to be padded to a maximum padded length 30M. A communication identifier 16 with a length between the lower length threshold 30L and the upper length threshold 30U is not to be padded.

In some embodiments, the method also comprises receiving a communication identifier padded based on the signaling (block 1710).

Figure 17B:
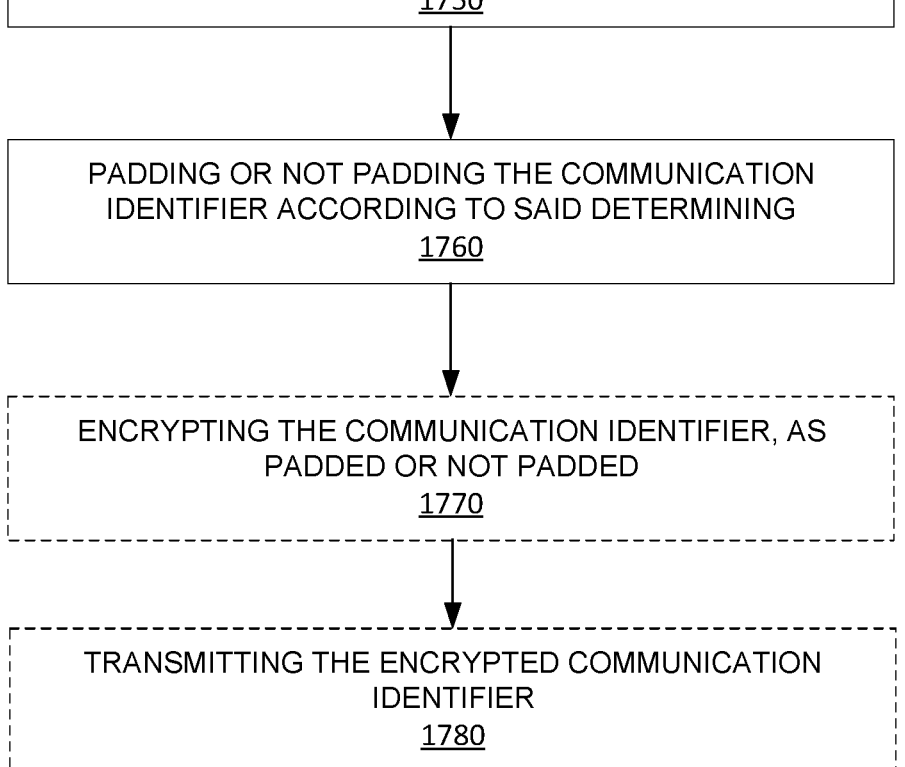
FIG. 17B is a logic flow diagram of a method performed by communication equipment according to other embodiments.

FIG. 17B depicts a method performed by communication equipment 20 configured for use in a communication network 10 in accordance with yet other particular embodiments. In some embodiments, the method comprises determining whether or not to pad a communication identifier 16 for the communication network 10 based respectively on whether or not an unpadded length of the communication identifier 16 is included in a range of allowed unpadded lengths (Block 1750). In some embodiments, the longest allowed unpadded length in the range is shorter than a maximum padded length by a length greater than 1. The method also comprises padding or not padding the communication identifier 16 according to said determining (Block 1760).

In some embodiments, the method may further comprise encrypting the communication identifier 16P as padded or not padded (Block 1770).

In some embodiments, the method may further comprise transmitting the encrypted communication identifier (Block 1780).

In some embodiments, the shortest allowed unpadded length in the range is a minimum padded length to which communication identifiers shorter than the shortest allowed unpadded length are padded.

In some embodiments, said determining comprises, if the unpadded length of the communication identifier 16 is shorter than the shortest allowed unpadded length in the range, determining to pad the communication identifier 16 in order for the communication identifier 16 to have the shortest allowed unpadded length in the range.

In some embodiments, said determining comprises, if the unpadded length of the communication identifier 16 is longer than the longest allowed unpadded length in the range, determining to pad the communication identifier 16 in order for the communication identifier 16 to have the maximum padded length.

In some embodiments, said determining comprises, if the unpadded length of the communication identifier 16 is included in the range of allowed unpadded lengths, determining to not pad the communication identifier 16.

In some embodiments, said determining comprises comparing the unpadded length of the communication identifier 16 to a minimum unpadded length threshold representing the shortest allowed unpadded length in the range. Said determining also comprises determining to pad the communication identifier 16 to the minimum unpadded length if, according to said comparing, the unpadded length of the communication identifier 16 is shorter than the minimum unpadded length threshold.

In some embodiments, said determining comprises comparing the unpadded length of the communication identifier 16 to a maximum unpadded length threshold representing the longest allowed unpadded length in the range. Said determining also comprises determining to pad the communication identifier 16 to the maximum padded length if, according to said comparing, the unpadded length of the communication identifier 16 is longer than the maximum unpadded length threshold.

In some embodiments, said determining comprises comparing the unpadded length of the communication identifier 16 to a minimum unpadded length threshold representing the shortest allowed unpadded length in the range and to a maximum unpadded length threshold representing the longest allowed unpadded length in the range. Said determining also comprises determining to not pad the communication identifier 16 if, according to said comparing, the unpadded length of the communication identifier is longer than or equal to the minimum unpadded length threshold and is shorter than or equal to the maximum unpadded length threshold.

In some embodiments, the method further comprises receiving, from a network node, signaling indicating the minimum unpadded length threshold.

In some embodiments, the method further comprises receiving, from a network node, signaling indicating the maximum unpadded length threshold In some embodiments, the method further comprises receiving, from a network node, signaling indicating the range of allowed unpadded lengths and/or the maximum padded length.

In some embodiments, communication identifiers longer than the longest allowed unpadded length are to be padded to the maximum padded length.

In some embodiments, the communication equipment 20 is core network equipment.

In some embodiments, the communication equipment 20 is a wireless device. In one or more of these embodiments, the method further comprises receiving, from network equipment, signaling indicating the range of allowed unpadded lengths. In one or more of these embodiments, the signaling indicates the range of allowed unpadded lengths by indicating the shortest allowed unpadded length in the range. The signaling indicates the range of allowed unpadded lengths by indicating the longest allowed unpadded length in the range.

In some embodiments, the method further comprises encrypting the communication identifier 16P, as padded or not padded according to said determining. In one or more of these embodiments, the encrypted communication identifier is a Subscription Concealed Identifier, SUCI.

Embodiments herein also include corresponding communication equipment 20, e.g., in the form of network communication equipment or a communication device. Embodiments herein for instance include communication equipment 20 configured to perform any of the steps of any of the embodiments described above for the communication equipment 20.

Embodiments also include communication equipment 20 comprising processing circuitry and power supply circuitry. The processing circuitry is configured to perform any of the steps of any of the embodiments described above for the communication equipment 20. The power supply circuitry is configured to supply power to the communication equipment 20.

Embodiments further include communication equipment 20 comprising processing circuitry. The processing circuitry is configured to perform any of the steps of any of the embodiments described above for the communication equipment 20. In some embodiments, the communication equipment 20 further comprises communication circuitry.

Embodiments further include communication equipment 20 comprising processing circuitry and memory. The memory contains instructions executable by the processing circuitry whereby the communication equipment 20 is configured to perform any of the steps of any of the embodiments described above for the communication equipment 20.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 18:
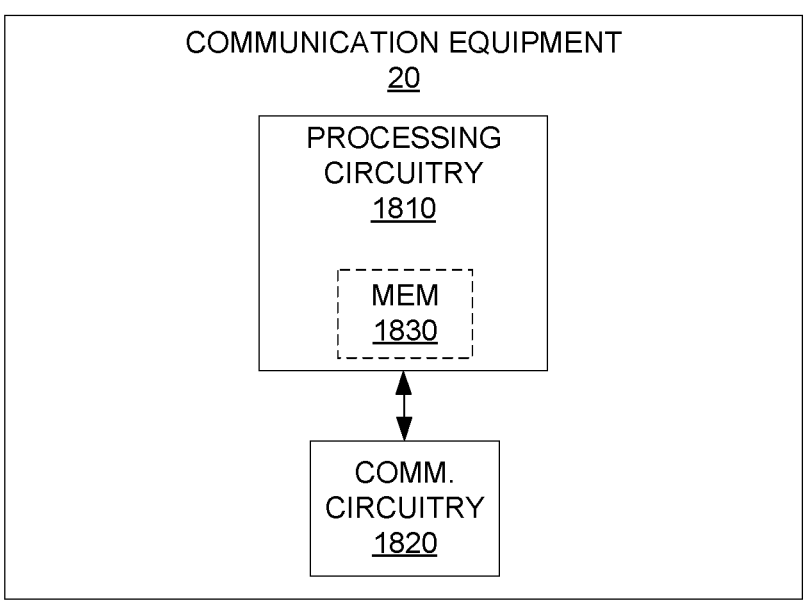
FIG. 18 is a block diagram of communication equipment according to some embodiments.

FIG. 18 for example illustrates communication equipment 20 as implemented in accordance with one or more embodiments. As shown, the communication equipment 20 includes processing circuitry 1810 and communication circuitry 1820. The communication circuitry 1820 is configured to transmit and/or receive information to and/or from one or more other nodes, e.g., via any communication technology. The processing circuitry 1810 is configured to perform processing described above, e.g., in FIGS. 15 and/or 16 and/or WW4, such as by executing instructions stored in memory 1830. The processing circuitry 1810 in this regard may implement certain functional means, units, or modules.

Figure 19:
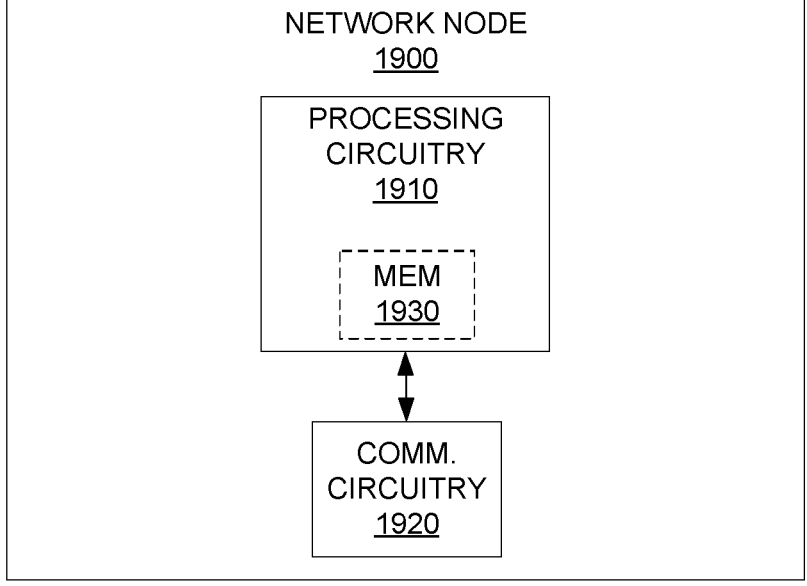
FIG. 19 is a block diagram of a network node according to some embodiments.

FIG. 19 illustrates a network node 1900 as implemented in accordance with one or more embodiments. As shown, the network node 1900 includes processing circuitry 1910 and communication circuitry 1920. The communication circuitry 1920 is configured to transmit and/or receive information to and/or from one or more other nodes, e.g., via any communication technology. The processing circuitry 1910 is configured to perform processing described above, e.g., in FIG. 17, such as by executing instructions stored in memory 1930. The processing circuitry 1910 in this regard may implement certain functional means, units, or modules.

Those skilled in the art will also appreciate that embodiments herein further include corresponding computer programs.

A computer program comprises instructions which, when executed on at least one processor of communication equipment 20, cause the communication equipment 20 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or network types for illustrative purposes, but the embodiments are similarly applicable in other contexts and/or network types not explicitly described.

Figure 20:
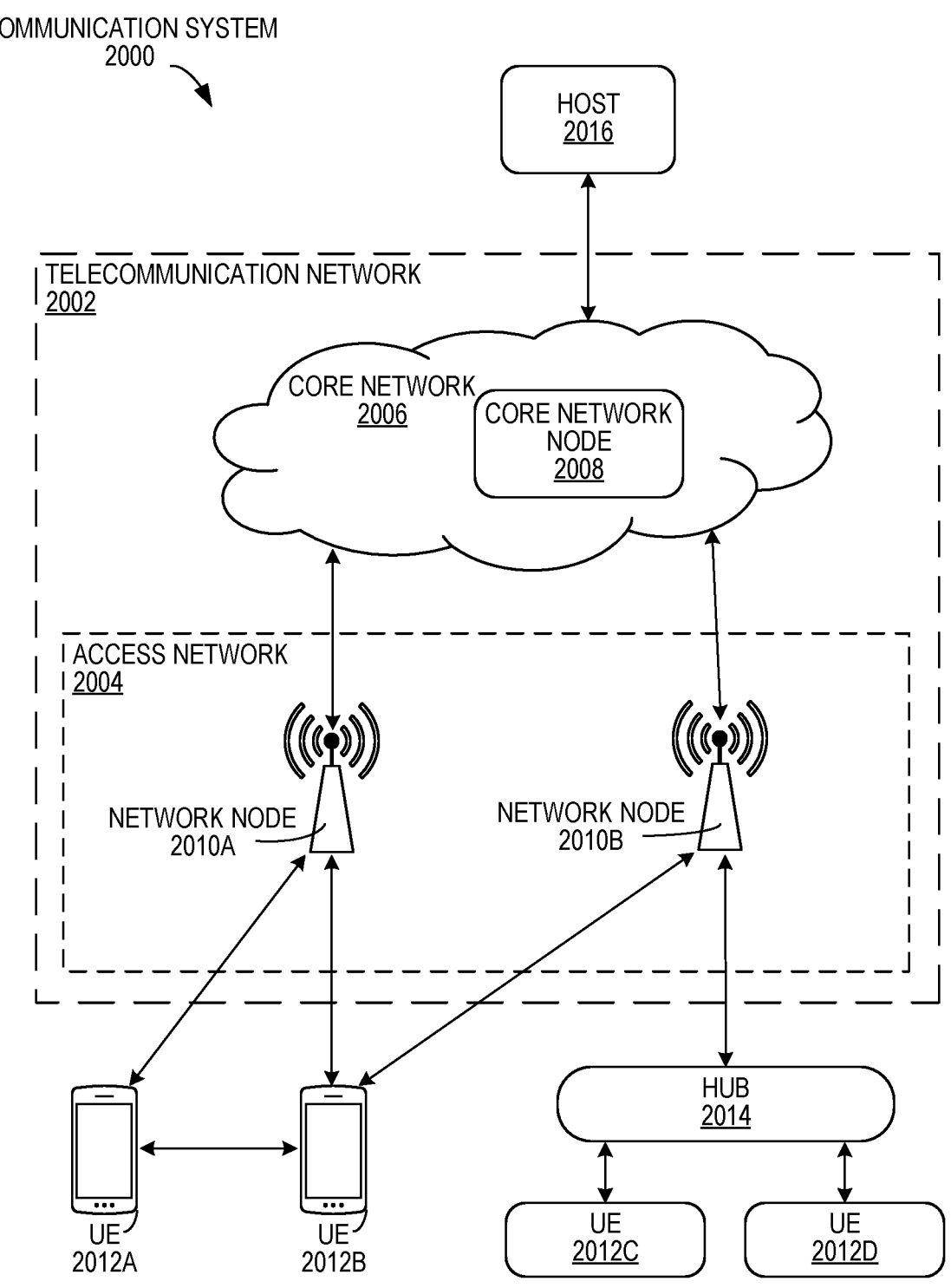
FIG. 20 is a block diagram of a communication system in accordance with some embodiments.

FIG. 20 shows an example of a communication system 2000 in accordance with some embodiments, as an example of the communication network 10 herein.

In the example, the communication system 2000 includes a telecommunication network 2002 that includes an access network 2004, such as a radio access network (RAN), and a core network 2006, which includes one or more core network nodes 2008. The access network 2004 includes one or more access network nodes, such as network nodes 2010*a* and 2010*b* (one or more of which may be generally referred to as network nodes 2010), or any other similar 3rd Generation Partnership Project (3GPP) access node or non-3GPP access point. The network nodes 2010 facilitate direct or indirect connection of user equipment (UE), such as by connecting UEs 2012*a*, 2012*b*, 2012*c*, and 2012*d* (one or more of which may be generally referred to as UEs 2012) to the core network 2006 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 2000 may include any number of wired or wireless networks, network nodes, UEs, and/or any other components or systems that may facilitate or participate in the communication of data and/or signals whether via wired or wireless connections. The communication system 2000 may include and/or interface with any type of communication, telecommunication, data, cellular, radio network, and/or other similar type of system.

The UEs 2012 may be any of a wide variety of communication devices, including wireless devices arranged, configured, and/or operable to communicate wirelessly with the network nodes 2010 and other communication devices. Similarly, the network nodes 2010 are arranged, capable, configured, and/or operable to communicate directly or indirectly with the UEs 2012 and/or with other network nodes or equipment in the telecommunication network 2002 to enable and/or provide network access, such as wireless network access, and/or to perform other functions, such as administration in the telecommunication network 2002.

In the depicted example, the core network 2006 connects the network nodes 2010 to one or more hosts, such as host 2016. These connections may be direct or indirect via one or more intermediary networks or devices. In other examples, network nodes may be directly coupled to hosts. The core network 2006 includes one more core network nodes (e.g., core network node 2008) that are structured with hardware and software components. Features of these components may be substantially similar to those described with respect to the UEs, network nodes, and/or hosts, such that the descriptions thereof are generally applicable to the corresponding components of the core network node 2008. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 2016 may be under the ownership or control of a service provider other than an operator or provider of the access network 2004 and/or the telecommunication network 2002, and may be operated by the service provider or on behalf of the service provider. The host 2016 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 2000 of FIG. 20 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 2002 is a cellular network that implements 3GPP standardized features. Accordingly, the telecommunications network 2002 may support network slicing to provide different logical networks to different devices that are connected to the telecommunication network 2002. For example, the telecommunications network 2002 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 2012 are configured to transmit and/or receive information without direct human interaction. For instance, a UE may be designed to transmit information to the access network 2004 on a predetermined schedule, when triggered by an internal or external event, or in response to requests from the access network 2004. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 2014 communicates with the access network 2004 to facilitate indirect communication between one or more UEs (e.g., UE 2012c and/or 2012d) and network nodes (e.g., network node 2010b). In some examples, the hub 2014 may be a controller, router, content source and analytics, or any of the other communication devices described herein regarding UEs. For example, the hub 2014 may be a broadband router enabling access to the core network 2006 for the UEs. As another example, the hub 2014 may be a controller that sends commands or instructions to one or more actuators in the UEs. Commands or instructions may be received from the UEs, network nodes 2010, or by executable code, script, process, or other instructions in the hub 2014. As another example, the hub 2014 may be a data collector that acts as temporary storage for UE data and, in some embodiments, may perform analysis or other processing of the data. As another example, the hub 2014 may be a content source. For example, for a UE that is a VR headset, display, loudspeaker or other media delivery device, the hub 2014 may retrieve VR assets, video, audio, or other media or data related to sensory information via a network node, which the hub 2014 then provides to the UE either directly, after performing local processing, and/or after adding additional local content. In still another example, the hub 2014 acts as a proxy server or orchestrator for the UEs, in particular in if one or more of the UEs are low energy IoT devices.

The hub 2014 may have a constant/persistent or intermittent connection to the network node 2010b. The hub 2014 may also allow for a different communication scheme and/or schedule between the hub 2014 and UEs (e.g., UE 2012c and/or 2012d), and between the hub 2014 and the core network 2006. In other examples, the hub 2014 is connected to the core network 2006 and/or one or more UEs via a wired connection. Moreover, the hub 2014 may be configured to connect to an M2M service provider over the access network 2004 and/or to another UE over a direct connection. In some scenarios, UEs may establish a wireless connection with the network nodes 2010 while still connected via the hub 2014 via a wired or wireless connection. In some embodiments, the hub 2014 may be a dedicated hub—that is, a hub whose primary function is to route communications to/from the UEs from/to the network node 2010b. In other embodiments, the hub 2014 may be a non-dedicated hub—that is, a device which is capable of operating to route communications between the UEs and network node 2010b, but which is additionally capable of operating as a communication start and/or end point for certain data channels.

Figure 21:
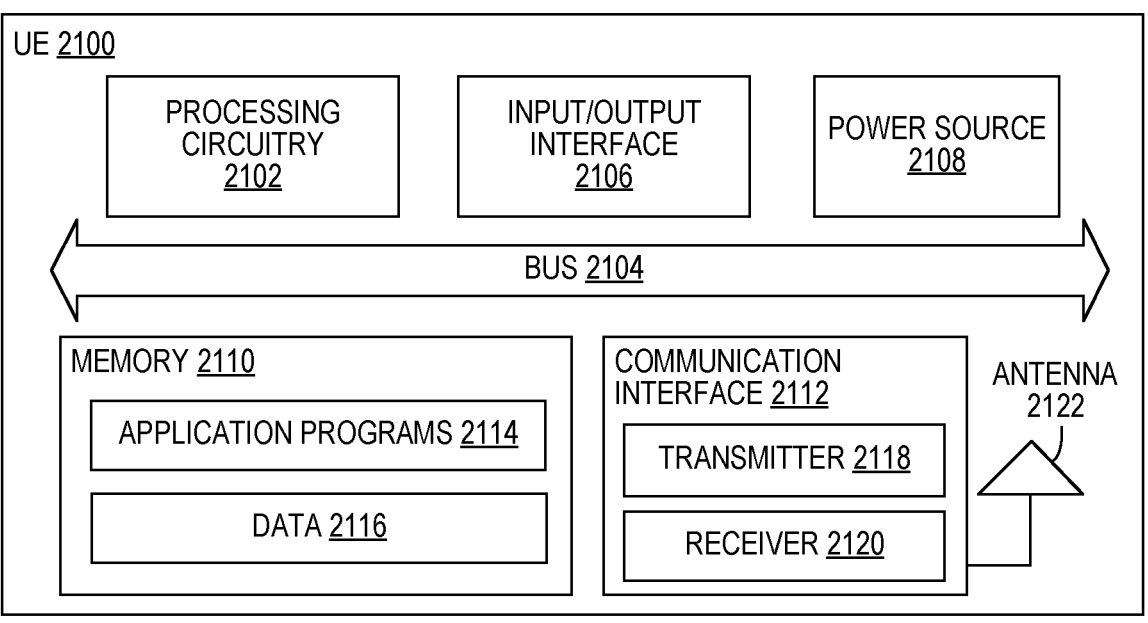
FIG. 21 is a block diagram of a user equipment according to some embodiments.

FIG. 21 shows a UE 2100 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V21), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 2100 includes processing circuitry 2102 that is operatively coupled via a bus 2104 to an input/output interface 2106, a power source 2108, a memory 2110, a communication interface 2112, and/or any other component, or any combination thereof. Certain UEs may utilize all or a subset of the components shown in FIG. 21. The level of integration between the components may vary from one UE to another UE. Further, certain UEs may contain multiple instances of a component, such as multiple processors, memories, transceivers, transmitters, receivers, etc.

The processing circuitry 2102 is configured to process instructions and data and may be configured to implement any sequential state machine operative to execute instructions stored as machine-readable computer programs in the memory 2110. The processing circuitry 2102 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 2102 may include multiple central processing units (CPUs).

In the example, the input/output interface 2106 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 2100. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 2108 is structured as a battery or battery pack. Other types of power sources, such as an external power source (e.g., an electricity outlet), photovoltaic device, or power cell, may be used. The power source 2108 may further include power circuitry for delivering power from the power source 2108 itself, and/or an external power source, to the various parts of the UE 2100 via input circuitry or an interface such as an electrical power cable. Delivering power may be, for example, for charging of the power source 2108. Power circuitry may perform any formatting, converting, or other modification to the power from the power source 2108 to make the power suitable for the respective components of the UE 2100 to which power is supplied.

The memory 2110 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 2110 includes one or more application programs 2114, such as an operating system, web browser application, a widget, gadget engine, or other application, and corresponding data 2116. The memory 2110 may store, for use by the UE 2100, any of a variety of various operating systems or combinations of operating systems.

The memory 2110 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 2110 may allow the UE 2100 to access instructions, application programs and the like, stored on transitory or non-transitory memory media, to off-load data, or to upload data. An article of manufacture, such as one utilizing a communication system may be tangibly embodied as or in the memory 2110, which may be or comprise a device-readable storage medium.

The processing circuitry 2102 may be configured to communicate with an access network or other network using the communication interface 2112. The communication interface 2112 may comprise one or more communication subsystems and may include or be communicatively coupled to an antenna 2122. The communication interface 2112 may include one or more transceivers used to communicate, such as by communicating with one or more remote transceivers of another device capable of wireless communication (e.g., another UE or a network node in an access network). Each transceiver may include a transmitter 2118 and/or a receiver 2120 appropriate to provide network communications (e.g., optical, electrical, frequency allocations, and so forth). Moreover, the transmitter 2118 and receiver 2120 may be coupled to one or more antennas (e.g., antenna 2122) and may share circuit components, software or firmware, or alternatively be implemented separately.

In the illustrated embodiment, communication functions of the communication interface 2112 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 2112, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 2100 shown in FIG. 21.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 22:
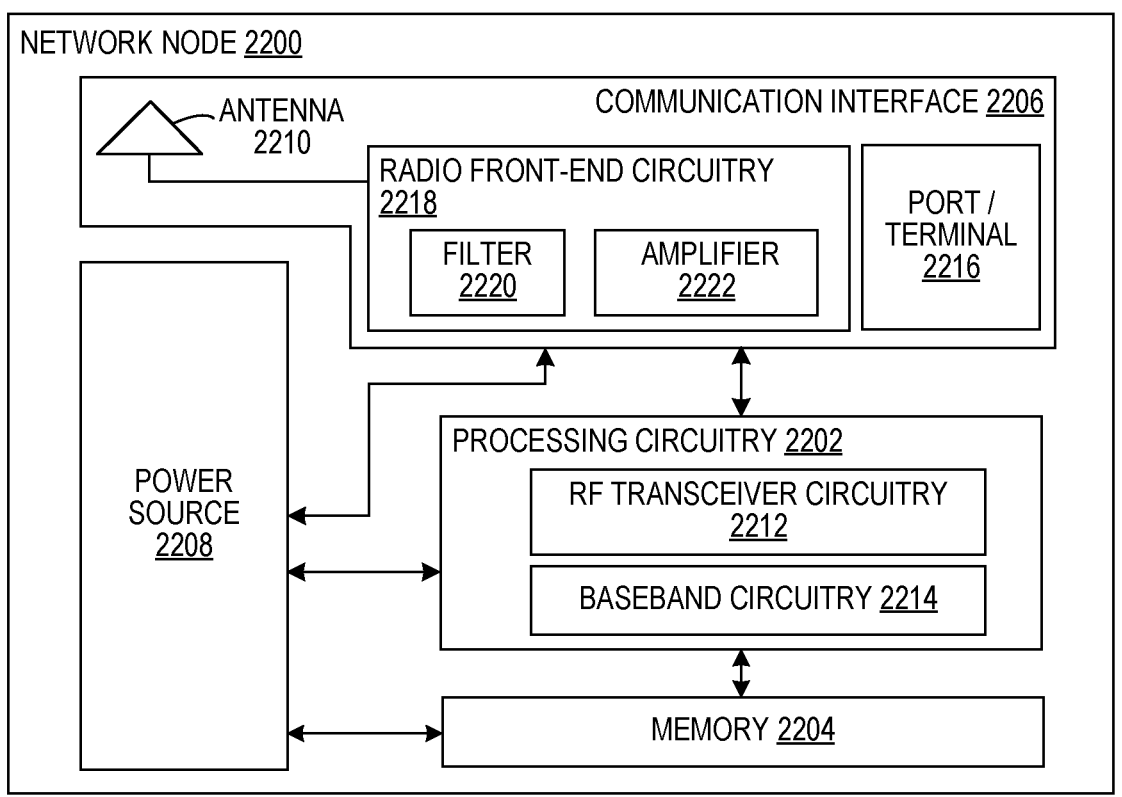
FIG. 22 is a block diagram of a network node according to some embodiments.

FIG. 22 shows a network node 2200 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 2200 includes a processing circuitry 2202, a memory 2204, a communication interface 2206, and a power source 2208. The network node 2200 may be composed of multiple physically separate components (e.g., a NodeB component and a RNC component, or a BTS component and a BSC component, etc.), which may each have their own respective components. In certain scenarios in which the network node 2200 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 2200 may be configured to support multiple radio access technologies (RATs). In such embodiments, some components may be duplicated (e.g., separate memory 2204 for different RATs) and some components may be reused (e.g., a same antenna 2210 may be shared by different RATs). The network node 2200 may also include multiple sets of the various illustrated components for different wireless technologies integrated into network node 2200, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 2200.

The processing circuitry 2202 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2200 components, such as the memory 2204, to provide network node 2200 functionality.

In some embodiments, the processing circuitry 2202 includes a system on a chip (SOC). In some embodiments, the processing circuitry 2202 includes one or more of radio frequency (RF) transceiver circuitry 2212 and baseband processing circuitry 2214. In some embodiments, the radio frequency (RF) transceiver circuitry 2212 and the baseband processing circuitry 2214 may be on separate chips (or sets of chips), boards, or units, such as radio units and digital units. In alternative embodiments, part or all of RF transceiver circuitry 2212 and baseband processing circuitry 2214 may be on the same chip or set of chips, boards, or units.

The memory 2204 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 2202. The memory 2204 may store any suitable instructions, data, or information, including a computer program, software, an application including one or more of logic, rules, code, tables, and/or other instructions capable of being executed by the processing circuitry 2202 and utilized by the network node 2200. The memory 2204 may be used to store any calculations made by the processing circuitry 2202 and/or any data received via the communication interface 2206. In some embodiments, the processing circuitry 2202 and memory 2204 is integrated.

The communication interface 2206 is used in wired or wireless communication of signaling and/or data between a network node, access network, and/or UE. As illustrated, the communication interface 2206 comprises port(s)/terminal(s) 2216 to send and receive data, for example to and from a network over a wired connection. The communication interface 2206 also includes radio front-end circuitry 2218 that may be coupled to, or in certain embodiments a part of, the antenna 2210. Radio front-end circuitry 2218 comprises filters 2220 and amplifiers 2222. The radio front-end circuitry 2218 may be connected to an antenna 2210 and processing circuitry 2202. The radio front-end circuitry may be configured to condition signals communicated between antenna 2210 and processing circuitry 2202. The radio front-end circuitry 2218 may receive digital data that is to be sent out to other network nodes or UEs via a wireless connection. The radio front-end circuitry 2218 may convert the digital data into a radio signal having the appropriate channel and bandwidth parameters using a combination of filters 2220 and/or amplifiers 2222. The radio signal may then be transmitted via the antenna 2210. Similarly, when receiving data, the antenna 2210 may collect radio signals which are then converted into digital data by the radio front-end circuitry 2218. The digital data may be passed to the processing circuitry 2202. In other embodiments, the communication interface may comprise different components and/or different combinations of components.

In certain alternative embodiments, the network node 2200 does not include separate radio front-end circuitry 2218, instead, the processing circuitry 2202 includes radio front-end circuitry and is connected to the antenna 2210. Similarly, in some embodiments, all or some of the RF transceiver circuitry 2212 is part of the communication interface 2206. In still other embodiments, the communication interface 2206 includes one or more ports or terminals 2216, the radio front-end circuitry 2218, and the RF transceiver circuitry 2212, as part of a radio unit (not shown), and the communication interface 2206 communicates with the baseband processing circuitry 2214, which is part of a digital unit (not shown).

The antenna 2210 may include one or more antennas, or antenna arrays, configured to send and/or receive wireless signals. The antenna 2210 may be coupled to the radio front-end circuitry 2218 and may be any type of antenna capable of transmitting and receiving data and/or signals wirelessly. In certain embodiments, the antenna 2210 is separate from the network node 2200 and connectable to the network node 2200 through an interface or port.

The antenna 2210, communication interface 2206, and/or the processing circuitry 2202 may be configured to perform any receiving operations and/or certain obtaining operations described herein as being performed by the network node. Any information, data and/or signals may be received from a UE, another network node and/or any other network equipment. Similarly, the antenna 2210, the communication interface 2206, and/or the processing circuitry 2202 may be configured to perform any transmitting operations described herein as being performed by the network node. Any information, data and/or signals may be transmitted to a UE, another network node and/or any other network equipment.

The power source 2208 provides power to the various components of network node 2200 in a form suitable for the respective components (e.g., at a voltage and current level needed for each respective component). The power source 2208 may further comprise, or be coupled to, power management circuitry to supply the components of the network node 2200 with power for performing the functionality described herein. For example, the network node 2200 may be connectable to an external power source (e.g., the power grid, an electricity outlet) via an input circuitry or interface such as an electrical cable, whereby the external power source supplies power to power circuitry of the power source 2208. As a further example, the power source 2208 may comprise a source of power in the form of a battery or battery pack which is connected to, or integrated in, power circuitry. The battery may provide backup power should the external power source fail.

Embodiments of the network node 2200 may include additional components beyond those shown in FIG. 22 for providing certain aspects of the network node's functionality, including any of the functionality described herein and/or any functionality necessary to support the subject matter described herein. For example, the network node 2200 may include user interface equipment to allow input of information into the network node 2200 and to allow output of information from the network node 2200. This may allow a user to perform diagnostic, maintenance, repair, and other administrative functions for the network node 2200.

Figure 23:
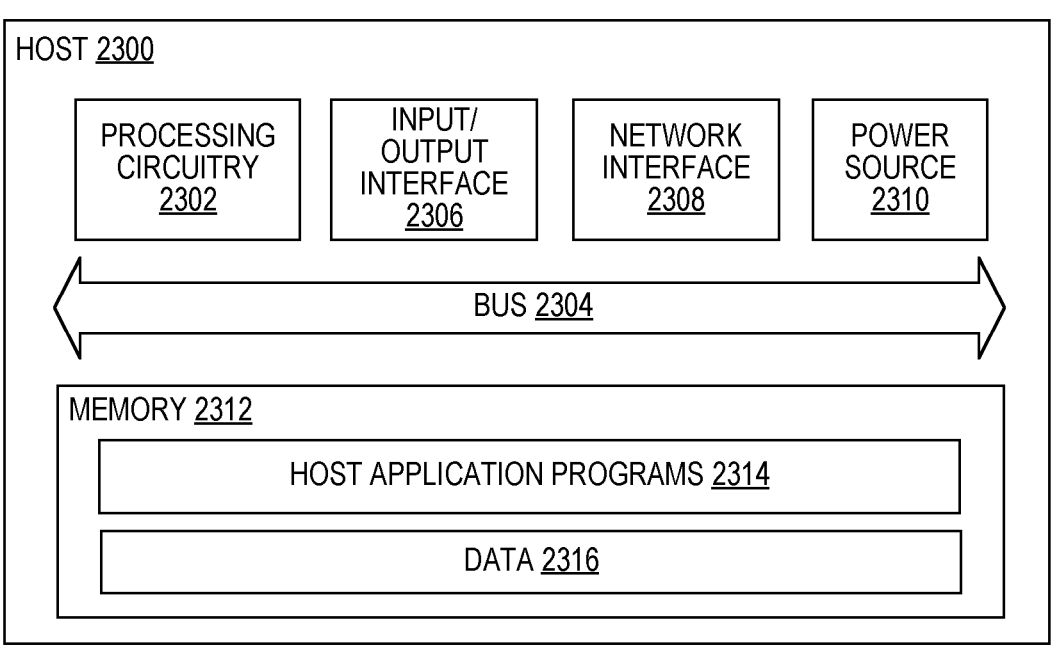
FIG. 23 is a block diagram of a host according to some embodiments.

FIG. 23 is a block diagram of a host 2300, which may be an embodiment of the host 2016 of FIG. 20, in accordance with various aspects described herein. As used herein, the host 2300 may be or comprise various combinations hardware and/or software, including a standalone server, a blade server, a cloud-implemented server, a distributed server, a virtual machine, container, or processing resources in a server farm. The host 2300 may provide one or more services to one or more UEs.

The host 2300 includes processing circuitry 2302 that is operatively coupled via a bus 2304 to an input/output interface 2306, a network interface 2308, a power source 2310, and a memory 2312. Other components may be included in other embodiments. Features of these components may be substantially similar to those described with respect to the devices of previous figures, such as FIGS. 21 and 22, such that the descriptions thereof are generally applicable to the corresponding components of host 2300.

The memory 2312 may include one or more computer programs including one or more host application programs 2314 and data 2316, which may include user data, e.g., data generated by a UE for the host 2300 or data generated by the host 2300 for a UE. Embodiments of the host 2300 may utilize only a subset or all of the components shown. The host application programs 2314 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 2314 may also provide for user authentication and licensing checks and may periodically report health, routes, and content availability to a central node, such as a device in or on the edge of a core network. Accordingly, the host 2300 may select and/or indicate a different host for over-the-top services for a UE. The host application programs 2314 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 24:
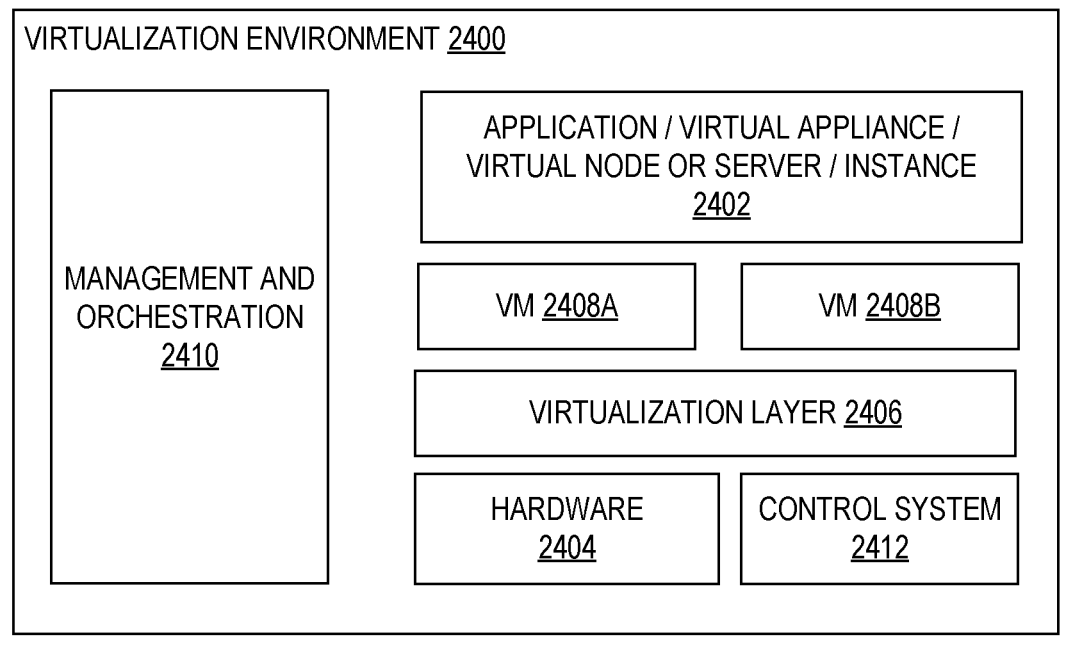
FIG. 24 is a block diagram of a virtualization environment according to some embodiments.

FIG. 24 is a block diagram illustrating a virtualization environment 2400 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 2400 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 2402 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 2404 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 2406 (also referred to as hypervisors or virtual machine monitors (VMMs)), provide VMs 2408a and 2408b (one or more of which may be generally referred to as VMs 2408), and/or perform any of the functions, features and/or benefits described in relation with some embodiments described herein. The virtualization layer 2406 may present a virtual operating platform that appears like networking hardware to the VMs 2408.

The VMs 2408 comprise virtual processing, virtual memory, virtual networking or interface and virtual storage, and may be run by a corresponding virtualization layer 2406. Different embodiments of the instance of a virtual appliance 2402 may be implemented on one or more of VMs 2408, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 2408 may be a software implementation of a physical machine that runs programs as if they were executing on a physical, non-virtualized machine. Each of the VMs 2408, and that part of hardware 2404 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 2408 on top of the hardware 2404 and corresponds to the application 2402.

Hardware 2404 may be implemented in a standalone network node with generic or specific components. Hardware 2404 may implement some functions via virtualization. Alternatively, hardware 2404 may be part of a larger cluster of hardware (e.g. such as in a data center or CPE) where many hardware nodes work together and are managed via management and orchestration 2410, which, among others, oversees lifecycle management of applications 2402. In some embodiments, hardware 2404 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 2412 which may alternatively be used for communication between hardware nodes and radio units.

Figure 25:
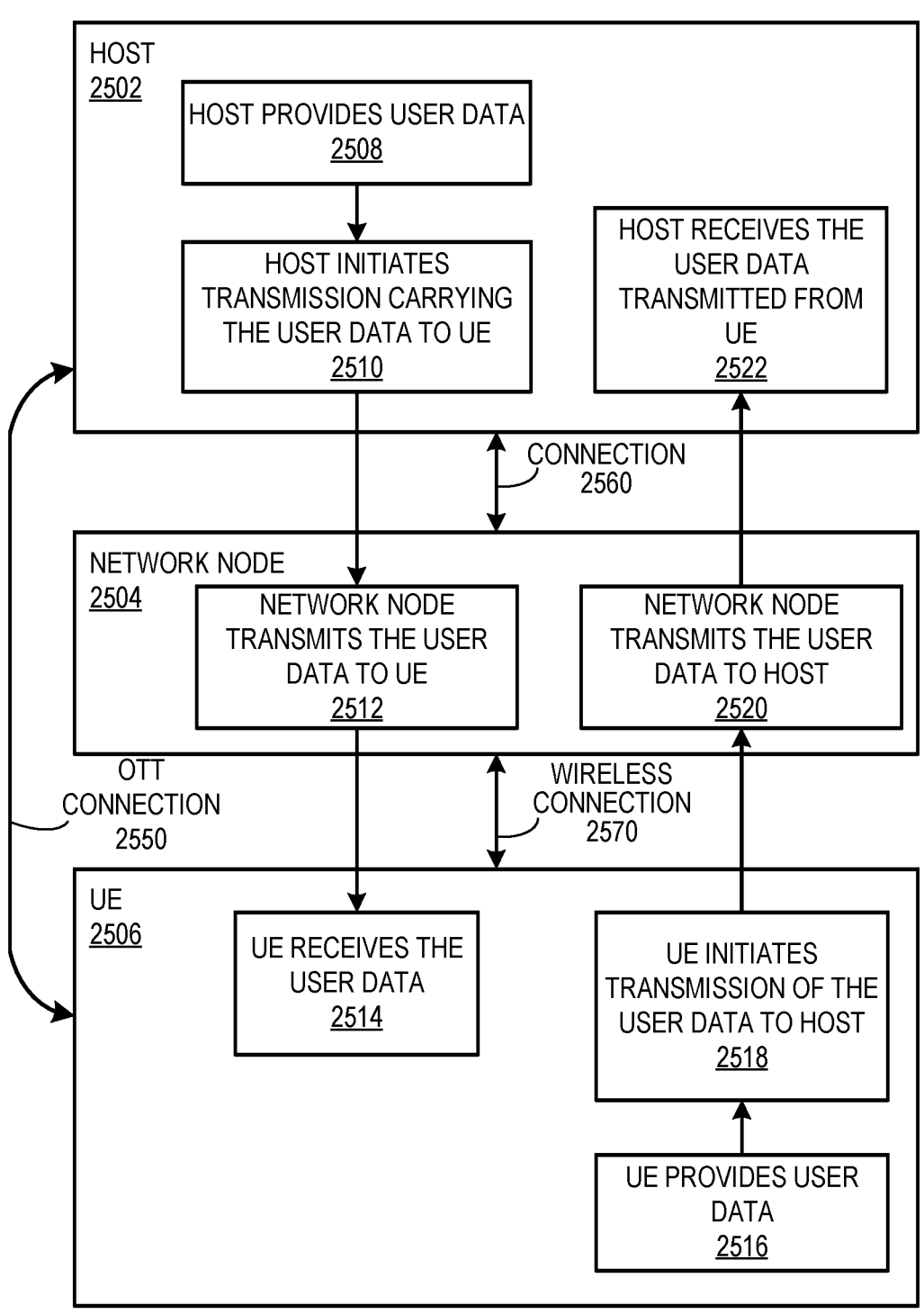
FIG. 25 is a block diagram of a host communicating via a network node with a UE over a partially wireless connection in accordance with some embodiments.

FIG. 25 shows a communication diagram of a host 2502 communicating via a network node 2504 with a UE 2506 over a partially wireless connection in accordance with some embodiments. Example implementations, in accordance with various embodiments, of the UE (such as a UE 2012a of FIG. 20 and/or UE 2100 of FIG. 21), network node (such as network node 2010a of FIG. 20 and/or network node 2200 of FIG. 22), and host (such as host 2016 of FIG. 20 and/or host 2300 of FIG. 23) discussed in the preceding paragraphs will now be described with reference to FIG. 25.

Like host 2300, embodiments of host 2502 include hardware, such as a communication interface, processing circuitry, and memory. The host 2502 also includes software, which is stored in or accessible by the host 2502 and executable by the processing circuitry. The software includes a host application that may be operable to provide a service to a remote user, such as the UE 2506 connecting via an over-the-top (OTT) connection 2550 extending between the UE 2506 and host 2502. In providing the service to the remote user, a host application may provide user data which is transmitted using the OTT connection 2550.

The network node 2504 includes hardware enabling it to communicate with the host 2502 and UE 2506. The connection 2560 may be direct or pass through a core network (like core network 2006 of FIG. 20) and/or one or more other intermediate networks, such as one or more public, private, or hosted networks. For example, an intermediate network may be a backbone network or the Internet.

The UE 2506 includes hardware and software, which is stored in or accessible by UE 2506 and executable by the UE's processing circuitry. The software includes a client application, such as a web browser or operator-specific "app" that may be operable to provide a service to a human or non-human user via UE 2506 with the support of the host 2502. In the host 2502, an executing host application may communicate with the executing client application via the OTT connection 2550 terminating at the UE 2506 and host 2502. In providing the service to the user, the UE's client application may receive request data from the host's host application and provide user data in response to the request data. The OTT connection 2550 may transfer both the request data and the user data. The UE's client application may interact with the user to generate the user data that it provides to the host application through the OTT connection 2550.

The OTT connection 2550 may extend via a connection 2560 between the host 2502 and the network node 2504 and via a wireless connection 2570 between the network node 2504 and the UE 2506 to provide the connection between the host 2502 and the UE 2506. The connection 2560 and wireless connection 2570, over which the OTT connection 2550 may be provided, have been drawn abstractly to illustrate the communication between the host 2502 and the UE 2506 via the network node 2504, without explicit reference to any intermediary devices and the precise routing of messages via these devices.

As an example of transmitting data via the OTT connection 2550, in step 2508, the host 2502 provides user data, which may be performed by executing a host application. In some embodiments, the user data is associated with a particular human user interacting with the UE 2506. In other embodiments, the user data is associated with a UE 2506 that shares data with the host 2502 without explicit human interaction. In step 2510, the host 2502 initiates a transmission carrying the user data towards the UE 2506. The host 2502 may initiate the transmission responsive to a request transmitted by the UE 2506. The request may be caused by human interaction with the UE 2506 or by operation of the client application executing on the UE 2506. The transmission may pass via the network node 2504, in accordance with the teachings of the embodiments described throughout this disclosure. Accordingly, in step 2512, the network node 2504 transmits to the UE 2506 the user data that was carried in the transmission that the host 2502 initiated, in accordance with the teachings of the embodiments described throughout this disclosure. In step 2514, the UE 2506 receives the user data carried in the transmission, which may be performed by a client application executed on the UE 2506 associated with the host application executed by the host 2502.

In some examples, the UE 2506 executes a client application which provides user data to the host 2502. The user data may be provided in reaction or response to the data received from the host 2502. Accordingly, in step 2516, the UE 2506 may provide user data, which may be performed by executing the client application. In providing the user data, the client application may further consider user input received from the user via an input/output interface of the UE 2506. Regardless of the specific manner in which the user data was provided, the UE 2506 initiates, in step 2518, transmission of the user data towards the host 2502 via the network node 2504. In step 2520, in accordance with the teachings of the embodiments described throughout this disclosure, the network node 2504 receives user data from the UE 2506 and initiates transmission of the received user data towards the host 2502. In step 2522, the host 2502 receives the user data carried in the transmission initiated by the UE 2506.

One or more of the various embodiments improve the performance of OTT services provided to the UE 2506 using the OTT connection 2550, in which the wireless connection 2570 forms the last segment.

In an example scenario, factory status information may be collected and analyzed by the host 2502. As another example, the host 2502 may process audio and video data which may have been retrieved from a UE for use in creating maps. As another example, the host 2502 may collect and analyze real-time data to assist in controlling vehicle congestion (e.g., controlling traffic lights). As another example, the host 2502 may store surveillance video uploaded by a UE. As another example, the host 2502 may store or control access to media content such as video, audio, VR or AR which it can broadcast, multicast or unicast to UEs. As other examples, the host 2502 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 2550 between the host 2502 and UE 2506, in response to variations in the measurement results. The measurement procedure and/or the network functionality for reconfiguring the OTT connection may be implemented in software and hardware of the host 2502 and/or UE 2506. In some embodiments, sensors (not shown) may be deployed in or in association with other devices through which the OTT connection 2550 passes; the sensors may participate in the measurement procedure by supplying values of the monitored quantities exemplified above, or supplying values of other physical quantities from which software may compute or estimate the monitored quantities. The reconfiguring of the OTT connection 2550 may include message format, retransmission settings, preferred routing etc.; the reconfiguring need not directly alter the operation of the network node 2504. Such procedures and functionalities may be known and practiced in the art. In certain embodiments, measurements may involve proprietary UE signaling that facilitates measurements of throughput, propagation times, latency and the like, by the host 2502. The measurements may be implemented in that software causes messages to be transmitted, in particular empty or 'dummy' messages, using the OTT connection 2550 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

The term "A and/or B" as used herein covers embodiments having A alone, B alone, or both A and B together. The term "A and/or B" may therefore equivalently mean "at least one of any one or more of A and B".

Notably, modifications and other embodiments of the present disclosure will come to mind to one skilled in the art having the benefit of the teachings presented in the foregoing descriptions and the associated drawings. Therefore, it is to be understood that the present disclosure is not to be limited to the specific embodiments disclosed and that modifications and other embodiments are intended to be included within the scope of this disclosure. Although specific terms may be employed herein, they are used in a generic and descriptive sense only and not for purposes of limitation.

Example embodiments of the techniques and apparatus described herein include, but are not limited to, the following enumerated examples:

Group A Embodiments

A1. A method performed by communication equipment configured for use in a communication network, the method comprising:

determining an extent to which a communication identifier for the communication network is to be padded in order for the communication identifier to have a length that is included in a set of allowed lengths, wherein, for each of at least two allowed lengths in the set, the allowed length differs from the next shortest or longest allowed length in the set by a common length difference, and wherein the longest allowed length among said at least two allowed lengths differs from the next longest allowed length in the set by more than the common length difference; and performing, or assisting other communication equipment to perform, padding of the communication identifier to the determined extent.

A2. The method of embodiment A1, wherein the common length difference is equal to 1 such that, for each of said at least two allowed lengths in the set, the allowed length differs from the next shortest or longest allowed length in the set by 1.

A3. The method of any of embodiments A1-A2, wherein the shortest allowed length among said at least two allowed lengths is the shortest allowed length in the set of allowed lengths.

A4. The method of any of embodiments A1-A2, wherein the shortest allowed length among said at least two allowed lengths is longer than the shortest allowed length in the set of allowed lengths.

A5. The method of any of embodiments A1-A4, wherein the shortest allowed length among said at least two allowed lengths differs from the next longest allowed length in the set by the common length difference.

A6. The method of any of embodiments A1-A5, wherein the longest allowed length among said at least two allowed lengths differs from the next shortest allowed length in the set by the common length difference.

A7. The method of any of embodiments A1-A6, wherein the next longest allowed length from which the longest allowed length among said at least two allowed lengths differs by more than the common length difference is the longest allowed length in the set.

A8. The method of any of embodiments A1-A7, wherein the set of allowed lengths comprises:

a range of consecutive lengths between a lower length threshold and an upper length threshold, wherein each allowed length in the range of consecutive lengths differs from the next shortest or longest allowed length in the set by 1; and a maximum allowed length, wherein the longest allowed length in the range differs from the maximum allowed length by more than 1.

A9. The method of embodiment A8, wherein said determining comprises:

if the length of the communication identifier is less than the lower length threshold, determining an extent to which the communication identifier is to be padded in order for the communication identifier to have a length equal to the lower length threshold;

if the length of the communication identifier is greater than the upper length threshold, determining an extent to which the communication identifier is to be padded in order for the communication identifier to have a length equal to the maximum allowed length; and if the length of the communication identifier is greater than or equal to the lower length threshold and is less than or equal to the upper length threshold, determining that the communication identifier need not be padded to any extent in order for the communication identifier to have a length that is included in the set of allowed lengths.

A10. The method of any of embodiments A8-A9, further comprising receiving, from a network node, signaling indicating the lower length threshold and/or the upper length threshold and/or the maximum allowed length.

A10-2. The method of any of embodiments A8-A9, wherein at least one of the lower length threshold, the upper length threshold, and the maximum allowed length is preconfigured at the communication equipment.

A10-3. The method of any of embodiments A8-A9, wherein the wherein at least one of the lower length threshold, the upper length threshold, and the maximum allowed length is preconfigured on an integrated circuit card that is embedded in or removably inserted in the communication equipment.

A11. The method of any of embodiments A1-A10, further comprising encrypting the communication identifier, as padded to the determined extent.

A12. The method of embodiment A11, wherein the encrypted communication identifier is a Subscription Concealed Identifier, SUCI.

A13. The method of any of embodiments A1-A12, wherein said assisting comprises transmitting, to the other communication equipment, signaling indicating the determined extent to which the communication identifier is to be padded.

A14. The method of any of embodiments A1-A13, wherein the communication equipment is core network equipment, and wherein the other communication equipment is a wireless device.

A15. The method of any of embodiments A1-A14, wherein the communication equipment is core network equipment.

A16. The method of any of embodiments A1-A12, wherein the communication equipment is a wireless device, and wherein said performing or assisting comprises performing padding of the communication identifier to the determined extent.

A17. The method of embodiment A16, further comprising receiving, from core network equipment, signaling indicating the set of allowed lengths.

A18. The method of embodiment A17, wherein the signaling indicates the set of allowed lengths by indicating:

a lower length threshold representing the shortest allowed length among said at least two allowed lengths in the set;

an upper length threshold representing the longest allowed length among said at least two allowed lengths in the set; and the longest allowed length in the set.

A19. The method of any of embodiments A16-A18, further comprising transmitting, to a network node, signaling indicating a scheme according to which the wireless device has padded the communication identifier.

AA1. A method performed by communication equipment configured for use in a communication network, the method comprising:

determining whether or not to pad a communication identifier for the communication network based respectively on whether or not an unpadded length of the communication identifier is included in a range of allowed unpadded lengths, wherein the longest allowed unpadded length in the range is shorter than a maximum padded length by a length greater than 1; and padding or not padding the communication identifier according to said determining.

AA2. The method of embodiment AA1, wherein the shortest allowed unpadded length in the range is a minimum padded length to which communication identifiers shorter than the shortest allowed unpadded length are padded.

AA3. The method of any of embodiments AA1-AA2, wherein said determining comprises, if the unpadded length of the communication identifier is shorter than the shortest allowed unpadded length in the range, determining to pad the communication identifier in order for the communication identifier to have the shortest allowed unpadded length in the range.

AA4. The method of any of embodiments AA1-AA3, wherein said determining comprises, if the unpadded length of the communication identifier is longer than the longest allowed unpadded length in the range, determining to pad the communication identifier in order for the communication identifier to have the maximum padded length.

AA5. The method of any of embodiments AA1-AA4, wherein said determining comprises, if the unpadded length of the communication identifier is included in the range of allowed unpadded lengths, determining to not pad the communication identifier.

AA6. The method of any of embodiments AA1-AA5, wherein said determining comprises:

comparing the unpadded length of the communication identifier to a minimum unpadded length threshold representing the shortest allowed unpadded length in the range; and determining to pad the communication identifier to the minimum unpadded length if, according to said comparing, the unpadded length of the communication identifier is shorter than the minimum unpadded length threshold.

AA7. The method of any of embodiments AA1-AA6, wherein said determining comprises:

comparing the unpadded length of the communication identifier to a maximum unpadded length threshold representing the longest allowed unpadded length in the range; and determining to pad the communication identifier to the maximum padded length if, according to said comparing, the unpadded length of the communication identifier is longer than the maximum unpadded length threshold.

AA8. The method of any of embodiments AA1-AA7 wherein said determining comprises:

comparing the unpadded length of the communication identifier to a minimum unpadded length threshold representing the shortest allowed unpadded length in the range and to a maximum unpadded length threshold representing the longest allowed unpadded length in the range; and determining to not pad the communication identifier if, according to said comparing, the unpadded length of the communication identifier is longer than or equal to the minimum unpadded length threshold and is shorter than or equal to the maximum unpadded length threshold.

AA9. The method of any of embodiments AA6 and AA8, further comprising receiving, from a network node, signaling indicating the minimum unpadded length threshold.

AA10. The method of any of embodiments AA7 and AA8, further comprising receiving, from a network node, signaling indicating the maximum unpadded length threshold.

AA11. The method of any of embodiments AA1-AA10, further comprising receiving, from a network node, signaling indicating the range of allowed unpadded lengths and/or the maximum padded length.

AA12. The method of any of embodiments AA1-AA11, wherein communication identifiers longer than the longest allowed unpadded length are to be padded to the maximum padded length.

AA13. The method of any of embodiments AA1-AA12, wherein the communication equipment is core network equipment.

AA14. The method of any of embodiments AA1-AA12, wherein the communication equipment is a wireless device.

AA15. The method of embodiment AA14, further comprising receiving, from network equipment, signaling indicating the range of allowed unpadded lengths.

AA16. The method of embodiment AA15, wherein the signaling indicates the range of allowed unpadded lengths by indicating:

the shortest allowed unpadded length in the range; and the longest allowed unpadded length in the range.

AA17. The method of any of embodiments AA1-AA16, further comprising encrypting the communication identifier, as padded or not padded according to said determining.

AA18. The method of embodiment AA17, wherein the encrypted communication identifier is a Subscription Concealed Identifier, SUCI.

AAA1. A method performed by communication equipment configured for use in a communication network, the method comprising:

comparing a length of a communication identifier for the communication network to a lower length threshold and to an upper length threshold, wherein the upper length threshold is greater than the lower length threshold;

if the length of the communication identifier is less than the lower length threshold according to said comparing, padding the communication identifier in order for the communication identifier to have a length equal to the lower length threshold;

if the length of the communication identifier is greater than the upper length threshold according to said comparing, padding the communication identifier in order for the communication identifier to have a length equal to a maximum padded length, wherein the maximum padded length is greater than the upper length threshold; and if the length of the communication identifier is greater than or equal to the lower length threshold and is less than or equal to the upper length threshold according to said comparing, refraining from padding the communication identifier.

AAA2. The method of embodiment AAA1, further comprising encrypting the communication identifier after said padding or said refraining from padding.

AAA3. A method performed by communication equipment configured for use in a communication network, the method comprising:

selectively padding a communication identifier for the communication network according to one or more rules, wherein according to the one or more rules:

if the length of the communication identifier is less than a lower length threshold, the communication identifier is to be padded to the lower length threshold;

if the length of the communication identifier is greater than an upper length threshold, the communication identifier is to be padded to a maximum padded length, wherein the maximum padded length is greater than the upper length threshold; and if the length of the communication identifier is greater than or equal to the lower length threshold and is less than or equal to the upper length threshold, the communication identifier is not to be padded.

AAA4. The method of embodiment AAA3, further comprising encrypting the communication identifier as selectively padded.

AAA5. The method of any of embodiments AAA1-AAA4, further comprising receiving, from a network node, signaling indicating the lower length threshold and/or the upper length threshold and/or the maximum padded length.

AAA6. A method performed by communication equipment configured for use in a communication network, the method comprising:

determining to which padded length to pad a communication identifier for the communication network, based on how many other communication identifiers for the communication network have, or are expected to have, an unpadded length that is the same as, or that is within the same range as, an unpadded length of the identifier; and performing, or assisting other communication equipment to perform, padding of the communication identifier to the padded length.

AAA7. A method performed by communication equipment configured for use in a communication network, the method comprising:

obtaining a communication identifier for the communication network;

deciding, based on whether a length of the communication identifier is between a lower length threshold and an upper length threshold, whether to pad the communication identifier, wherein the upper length threshold is less than a maximum padded identifier length; and padding, or not padding, the communication identifier according to said deciding.

AAA8. The method of embodiment AAA7, wherein the upper length threshold is less than a maximum padded identifier length by a length more than 2.

AAAA1. A method performed by communication equipment configured for use in a communication network, the method comprising:

receiving, from a network node, signaling indicating a lower length threshold and an upper length threshold, wherein a communication identifier with a length below the lower length threshold is to be padded to the lower length threshold, wherein a communication identifier with a length above the upper length threshold is to be padded to a maximum padded length, and wherein a communication identifier with a length between the lower length threshold and the upper length threshold is not to be padded.

AAAA2. The method of embodiment AAAA2, further comprising selectively padding a communication identifier based on the lower length threshold and the upper length threshold indicated by the received signaling.

AAAAA1. A method performed by communication equipment configured for use in a communication network, the method comprising:

determining if and how much to pad a communication identifier for the communication network, depending on a length of the communication identifier and one or more configured values.

AAAAA2. The method of embodiment AAAAA1, wherein the one or more configured values include at least one configured value provisioned by the communication network.

AAAAA3. The method of embodiment AAAAA1, wherein the one or more configured valued include at least one configured value that is preconfigured according to a communication network standard.

AAAAA4. The method of any of embodiments AAAAA1-AAAAA3, wherein the one or more configured values include:

a value of a lower length threshold to which to pad the communication identifier if the length of the communication identifier is less than the lower length threshold;

a value of an upper length threshold, wherein the communication identifier is not to be padded if the length of the communication identifier is greater than or equal to the lower length threshold and is less than or equal to the upper length threshold; and a maximum padded length to which to pad the communication identifier if the length of the communication identifier is greater than the upper length threshold.

AA. The method of any of the previous embodiments, further comprising:

providing user data; and forwarding the user data to a host via the transmission to the network node.

Group B Embodiments

B1. A method performed by a network node configured for use in a communication network, the method comprising:

transmitting, from the network node to a communication device in the communication network, signaling indicating a lower length threshold and an upper length threshold, wherein a communication identifier with a length below the lower length threshold is to be padded to the lower length threshold, wherein a communication identifier with a length above the upper length threshold is to be padded to a maximum padded length, and wherein a communication identifier with a length between the lower length threshold and the upper length threshold is not to be padded.

BB. The method of any of the previous embodiments, further comprising:

obtaining user data; and forwarding the user data to a host or a user equipment.

Group X Embodiments

X1. The method of any of the embodiments in Group A Embodiments or Group B Embodiments, wherein the communication network is a wireless communication network, and wherein the communication identifier is a wireless communication identifier for the wireless communication network.

X2. The method of embodiment X1, wherein the wireless communication identifier identifies a wireless communication device configured for use in the wireless communication network or identifies a subscription to the wireless communication network.

X3. The method of embodiment X2, wherein the communication equipment is the wireless communication device.

X4. The method of any of embodiments X1-X3, wherein the wireless communication identifier is a Subscription Permanent Identifier, SUPI.

X5. The method of any of embodiments X1-X3, wherein the wireless communication identifier is a portion of a Subscription Permanent Identifier, SUPI.

X6. The method of any of the embodiments in Group A Embodiments or Group B Embodiments, wherein the communication identifier is a username.

X7. The method of any of the embodiments in Group A Embodiments or Group B Embodiments, wherein the communication network is a wired communication network, and wherein the communication identifier is a wired communication identifier for the wired communication network.

Group C Embodiments

C1. Communication equipment configured to perform any of the steps of any of the Group A embodiments or Group X Embodiments.

C2. Communication equipment comprising processing circuitry configured to perform any of the steps of any of the Group A embodiments or Group X Embodiments.

C3. Communication equipment comprising:

communication circuitry; and processing circuitry configured to perform any of the steps of any of the Group A embodiments or Group X Embodiments.

C4. Communication equipment comprising:

processing circuitry configured to perform any of the steps of any of the Group A embodiments or Group X Embodiments; and power supply circuitry configured to supply power to the communication equipment.

C5. Communication equipment comprising:

processing circuitry and memory, the memory containing instructions executable by the processing circuitry whereby the communication equipment is configured to perform any of the steps of any of the Group A embodiments or Group X Embodiments.

C6. A user equipment (UE) comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments or Group X Embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

C7. A computer program comprising instructions which, when executed by at least one processor of communication equipment, causes the communication equipment to carry out the steps of any of the Group A embodiments or Group X Embodiments.

C8. A carrier containing the computer program of embodiment C7, wherein the carrier is one of an electronic signal, optical signal, radio signal, or computer readable storage medium.

C9. A network node configured to perform any of the steps of any of the Group B embodiments or Group X Embodiments.

C10. A network node comprising processing circuitry configured to perform any of the steps of any of the Group B embodiments or Group X Embodiments.

C11. A network node comprising:

communication circuitry; and processing circuitry configured to perform any of the steps of any of the Group B embodiments or Group X Embodiments.

C12. A network node comprising:

processing circuitry configured to perform any of the steps of any of the Group B embodiments or Group X Embodiments;

power supply circuitry configured to supply power to the network node.

C13. A network node comprising:

processing circuitry and memory, the memory containing instructions executable by the processing circuitry whereby the network node is configured to perform any of the steps of any of the Group B embodiments or Group X Embodiments.

C14. The network node of any of embodiments C9-C13, wherein the network node is a base station.

C15. A computer program comprising instructions which, when executed by at least one processor of a network node, causes the network node to carry out the steps of any of the Group B embodiments or Group X Embodiments.

C16. The computer program of embodiment C14, wherein the network node is a base station.

C17. A carrier containing the computer program of any of embodiments C15-C16, wherein the carrier is one of an electronic signal, optical signal, radio signal, or computer readable storage medium.

Group D Embodiments

D1. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments or Group X Embodiments.

D2. The communication system of the previous embodiment further including the base station.

D3. The communication system of the previous 2 embodiments, further including the UE, wherein the UE is configured to communicate with the base station.

D4. The communication system of the previous 3 embodiments, wherein:

the processing circuitry of the host computer is configured to execute a host application, thereby providing the user data; and the UE comprises processing circuitry configured to execute a client application associated with the host application.

D5. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments or Group X Embodiments.

D6. The method of the previous embodiment, further comprising, at the base station, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 embodiments.

D9. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments or Group X Embodiments.

D10. The communication system of the previous embodiment, wherein the cellular network further includes a base station configured to communicate with the UE.

D11. The communication system of the previous 2 embodiments, wherein:

the processing circuitry of the host computer is configured to execute a host application, thereby providing the user data; and the UE's processing circuitry is configured to execute a client application associated with the host application.

D12. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments or Group X Embodiments.

D13. The method of the previous embodiment, further comprising at the UE, receiving the user data from the base station.

D14. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments or Group X Embodiments.

D15. The communication system of the previous embodiment, further including the UE.

D16. The communication system of the previous 2 embodiments, further including the base station, wherein the base station comprises a radio interface configured to communicate with the UE and a communication interface configured to forward to the host computer the user data carried by a transmission from the UE to the base station.

D17. The communication system of the previous 3 embodiments, wherein:

the processing circuitry of the host computer is configured to execute a host application; and the UE's processing circuitry is configured to execute a client application associated with the host application, thereby providing the user data.

D18. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

D19. A method implemented in a communication system including a host computer, a base station and a user equipment (UE), the method comprising:

at the host computer, receiving user data transmitted to the base station from the UE, wherein the UE performs any of the steps of any of the Group A embodiments or Group X Embodiments.

D20. The method of the previous embodiment, further comprising, at the UE, providing the user data to the base station.

D21. The method of the previous 2 embodiments, further comprising:

at the UE, executing a client application, thereby providing the user data to be transmitted; and at the host computer, executing a host application associated with the client application.

D22. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments or Group X Embodiments.

D24. The communication system of the previous embodiment further including the base station.

D25. The communication system of the previous 2 embodiments, further including the UE, wherein the UE is configured to communicate with the base station.

D26. The communication system of the previous 3 embodiments, wherein:

the processing circuitry of the host computer is configured to execute a host application;

the UE is configured to execute a client application associated with the host application, thereby providing the user data to be received by the host computer.

48

D27. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments or Group X Embodiments.

D28. The method of the previous embodiment, further comprising at the base station, receiving the user data from the UE.

D29. The method of the previous 2 embodiments, further comprising at the base station, initiating a transmission of the received user data to the host computer.

The invention claimed is:

1. A method performed by communication equipment configured for use in a communication network, the method comprising:

determining an extent to which a communication identifier for the communication network is to be padded in order for the communication identifier to have a length that is included in a set of allowed lengths, wherein, for each of at least two allowed lengths in the set, the allowed length differs from the next shortest or longest allowed length in the set by a common length difference, and wherein the longest allowed length among said at least two allowed lengths differs from the next longest allowed length in the set by more than the common length difference; and performing, or assisting other communication equipment to perform, padding of the communication identifier to the determined extent.

2. The method of claim 1, wherein the common length difference is equal to 1 such that, for each of said at least two allowed lengths in the set, the allowed length differs from the next shortest or longest allowed length in the set by 1.

3. The method of claim 1, wherein the set of allowed lengths comprises:

a range of consecutive lengths between a lower length threshold and an upper length threshold, wherein each allowed length in the range of consecutive lengths differs from the next shortest or longest allowed length in the set by 1; and a maximum allowed length, wherein the longest allowed length in the range differs from the maximum allowed length by more than 1.

4. The method of claim 3, wherein said determining comprises:

if the length of the communication identifier is less than the lower length threshold, determining an extent to which the communication identifier is to be padded in order for the communication identifier to have a length equal to the lower length threshold;

if the length of the communication identifier is greater than the upper length threshold, determining an extent to which the communication identifier is to be padded in order for the communication identifier to have a length equal to the maximum allowed length; and if the length of the communication identifier is greater than or equal to the lower length threshold and is less than or equal to the upper length threshold, determining that the communication identifier need not be padded to any extent in order for the communication identifier to have a length that is included in the set of allowed lengths.

5. The method of claim 3, wherein at least one of the lower length threshold, the upper length threshold, and the maximum allowed length is:

preconfigured at the communication equipment; or preconfigured on an integrated circuit card that is embedded in or removably inserted in the communication equipment.

6. The method of claim 1, further comprising encrypting the communication identifier, as padded to the determined extent.

7. The method of claim 6, wherein the encrypted communication identifier is a Subscription Concealed Identifier (SUCI).

8. The method of claim 1, wherein the communication equipment is core network equipment, and wherein the other communication equipment is a wireless device.

9. The method of claim 8, further comprising receiving, from core network equipment, signaling indicating the set of allowed lengths.

10. The method of claim 8, further comprising transmitting, to a network node, signaling indicating a scheme according to which the wireless device has padded the communication identifier.

11. Communication equipment configured for use in a communication network, the communication equipment comprising:

communication circuitry; and processing circuitry configured to:

determine an extent to which a communication identifier for the communication network is to be padded in order for the communication identifier to have a length that is included in a set of allowed lengths, wherein, for each of at least two allowed lengths in the set, the allowed length differs from the next shortest or longest allowed length in the set by a common length difference, and wherein the longest allowed length among said at least two allowed lengths differs from the next longest allowed length in the set by more than the common length difference; and perform, or assist other communication equipment to perform, padding of the communication identifier to the determined extent.

12. The communication equipment of claim 11, wherein the common length difference is equal to 1 such that, for each of said at least two allowed lengths in the set, the allowed length differs from the next shortest or longest allowed length in the set by 1.

13. The communication equipment of claim 11, wherein the set of allowed lengths comprises:

a range of consecutive lengths between a lower length threshold and an upper length threshold, wherein each allowed length in the range of consecutive lengths differs from the next shortest or longest allowed length in the set by 1; and a maximum allowed length, wherein the longest allowed length in the range differs from the maximum allowed length by more than 1.

14. The communication equipment of claim 13, wherein the processing circuitry is configured to:

if the length of the communication identifier is less than the lower length threshold, determine an extent to which the communication identifier is to be padded in order for the communication identifier to have a length equal to the lower length threshold;

if the length of the communication identifier is greater than the upper length threshold, determine an extent to which the communication identifier is to be padded in order for the communication identifier to have a length equal to the maximum allowed length; and if the length of the communication identifier is greater than or equal to the lower length threshold and is less than or equal to the upper length threshold, determine that the communication identifier need not be padded to any extent in order for the communication identifier to have a length that is included in the set of allowed lengths.

15. The communication equipment of claim 13, wherein at least one of the lower length threshold, the upper length threshold, and the maximum allowed length is:

preconfigured at the communication equipment; or preconfigured on an integrated circuit card that is embedded in or removably inserted in the communication equipment.

16. The communication equipment of claim 11, wherein the processing circuitry is further configured to encrypt the communication identifier, as padded to the determined extent.

17. The communication equipment of claim 16, wherein the encrypted communication identifier is a Subscription Concealed Identifier (SUCI).

18. The communication equipment of claim 11, wherein the communication equipment is core network equipment, and wherein the other communication equipment is a wireless device.

19. The communication equipment of claim 18, wherein the processing circuitry is further configured to receive, from core network equipment, signaling indicating the set of allowed lengths.

20. The communication equipment of claim 18, wherein the processing circuitry is further configured to transmit, to a network node, signaling indicating a scheme according to which the wireless device has padded the communication identifier.

\*    \*    \*    \*    \*